US012578179B2

(12) United States Patent
Yamada

(10) Patent No.: US 12,578,179 B2
(45) Date of Patent: ***Mar. 17, 2026

(54) LASER INTERFEROMETER

(71) Applicant: SEIKO EPSON CORPORATION,
Tokyo (JP)

(72) Inventor: Kohei Yamada, Shiojiri (JP)

(73) Assignee: SEIKO EPSON CORPORATION,
Tokyo (JP)

( * ) Notice: Subject to any disclaimer, the term of this
patent is extended or adjusted under 35
U.S.C. 154(b) by 272 days.

This patent is subject to a terminal dis-
claimer.

(21) Appl. No.: 18/160,381

(22) Filed: Jan. 27, 2023

(65) Prior Publication Data

US 2023/0243636 A1     Aug. 3, 2023

(30) Foreign Application Priority Data

Feb. 2, 2022     (JP) ................................. 2022-014849

(51) Int. Cl.
*G01B 9/02*         (2022.01)
*G01H 9/00*         (2006.01)

(52) U.S. Cl.
CPC ..... *G01B 9/02045* (2013.01); *G01B 9/02049*
(2013.01); *G01H 9/00* (2013.01); *G01B*
*2290/35* (2013.01)

(58) Field of Classification Search
CPC .............. G01B 9/0201; G01B 9/02045; G01B
9/02083; G01B 2290/35; G02F 1/11;
(Continued)

(56) References Cited

U.S. PATENT DOCUMENTS

| | | | |
|---|---|---|---|
| 4,289,403 A | 9/1981 | Allington | |
| 5,925,968 A | 7/1999 | Yachi et al. | |

(Continued)

FOREIGN PATENT DOCUMENTS

| | | | |
|---|---|---|---|
| EP | 4095482 A | 11/2022 | |
| JP | H0238889 A | 2/1990 | |

(Continued)

OTHER PUBLICATIONS

Vignola J.F. et al: "Characterization of silicon micro-oscillators by
scanning laser vibrometry", Review of Scientific Instruments, Ameri-
can Institute of Physics, vol. 73 ,No. 10, Oct. 1, 2002, 5 Pages.
(Continued)

*Primary Examiner* — Michael A Lyons
(74) *Attorney, Agent, or Firm* — CHIP LAW GROUP

(57)     ABSTRACT
A laser interferometer includes: a laser light source config-
ured to emit first laser light; an optical modulator including
a vibration element that generates a vibration component in
a direction intersecting an incident surface of the first laser
light, and configured to modulate the first laser light by using
the vibration element to generate second laser light includ-
ing a modulation signal; a photodetector configured to
receive the second laser light and third laser light that
includes a sample signal generated by the first laser light
being reflected by an object, and output a light reception
signal; a demodulation circuit configured to demodulate the
sample signal from the light reception signal based on a
reference signal; and an oscillation circuit configured to
operate using the vibration element as a signal source and
output the reference signal to the demodulation circuit.

20 Claims, 11 Drawing Sheets

(58) Field of Classification Search
CPC . G02F 2/00; G01P 3/363; G01P 3/366; G01H
9/00
See application file for complete search history.

(56) References Cited

U.S. PATENT DOCUMENTS

| | | | | |
|---|---|---|---|---|
| 6,381,015 B1 * | 4/2002 | Sonehara | .............. | G01N 21/45 |
| | | | | 356/497 |
| 8,487,709 B2 * | 7/2013 | Ishikawa | .................. | H03B 5/36 |
| | | | | 331/109 |
| 11,668,555 B2 | 6/2023 | Yamada | | |
| 11,733,027 B2 * | 8/2023 | Yamada | ................. | G02B 7/008 |
| | | | | 356/450 |
| 12,181,277 B2 * | 12/2024 | Yamada | .................. | G01P 3/366 |
| 2012/0056684 A1 | 3/2012 | Kishi et al. | | |
| 2020/0058843 A1 | 2/2020 | Mizugaki | | |
| 2020/0309953 A1 | 10/2020 | Yamada | | |
| 2022/0065612 A1 | 3/2022 | Yamada | | |
| 2022/0065614 A1 | 3/2022 | Yamada et al. | | |
| 2022/0065892 A1 | 3/2022 | Yamada | | |

| | | | | |
|---|---|---|---|---|
| 2023/0079613 A1 * | 3/2023 | Yamada | ............. | G01B 9/02045 |
| | | | | 73/655 |
| 2023/0095129 A1 * | 3/2023 | Shimizu | ............. | G01B 9/02084 |
| | | | | 356/450 |

FOREIGN PATENT DOCUMENTS

| | | | | | |
|---|---|---|---|---|---|
| JP | H09-054293 A | | 2/1997 | | |
| JP | H01-152387 A | | 2/1999 | | |
| JP | H11-317624 A | | 11/1999 | | |
| JP | 2005094733 A | * | 4/2005 | | |
| JP | 2007-285898 A | | 11/2007 | | |
| JP | 4003302 B2 | * | 11/2007 | ............. | B41F 23/08 |
| JP | 2012060259 A | | 3/2012 | | |
| JP | 2020-165700 A | | 10/2020 | | |
| JP | 2022-038156 A | | 3/2022 | | |
| WO | 1998053733 A | | 12/1998 | | |

OTHER PUBLICATIONS

Office Action for JP Patent Application No. 2022014849, issued on Dec. 9, 2025, 6 pages.

* cited by examiner

*FIG. 2*

MAIN VIBRATION (IN-PLANE FLEXURAL VIBRATION MODE)

SUBSIDIARY VIBRATION (OUT-OF-PLANE VIBRATION MODE)

*FIG. 7*
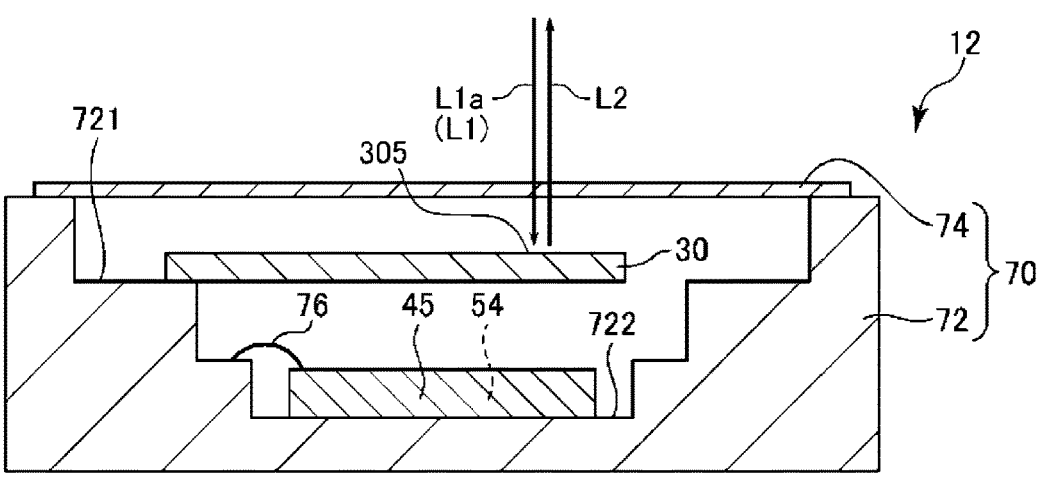
*FIG. 8*
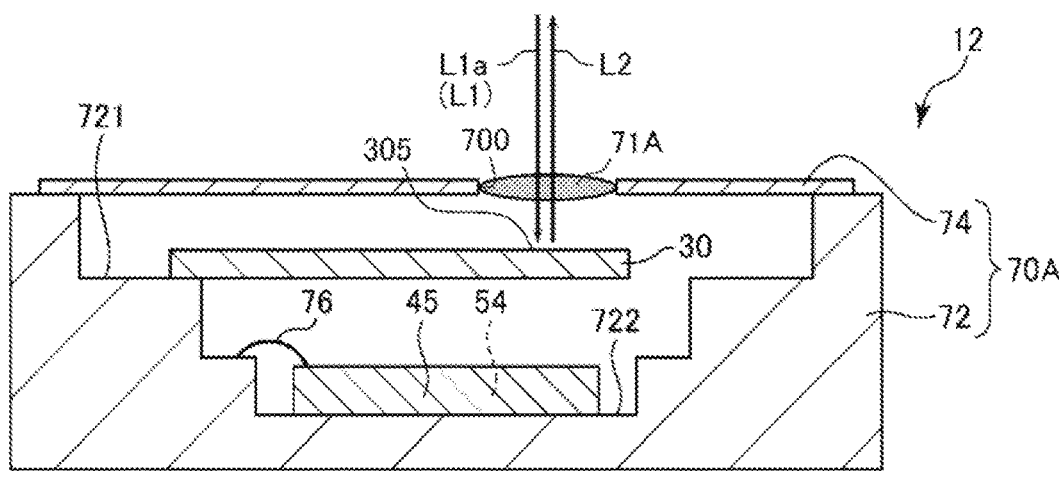
*FIG. 9*

RELATIONSHIP BETWEEN BESSEL COEFFICIENT $J_n(B)$
AND PHASE SHIFT B OF MODULATION SIGNAL

LASER INTERFEROMETER

The present application is based on, and claims priority from JP Application Serial Number 2022-014849, filed Feb. 2, 2022, the disclosure of which is hereby incorporated by reference herein in its entirety.

BACKGROUND

1. Technical Field

The present disclosure relates to a laser interferometer.

2. Related Art

JP-A-2020-165700 (Patent Literature 1) discloses a laser Doppler measurement device that grasps movement of a moving object. In the laser Doppler measurement device, an object to be measured is irradiated with laser light, and movement thereof is measured based on scattered laser light subjected to Doppler shift. Specifically, a shift amount of a frequency of the laser light is obtained by using heterodyne interference, and a speed and displacement of the moving object are obtained based on the shift amount.

The laser Doppler measurement device disclosed in Patent Literature 1 includes a frequency shifter type optical modulator. The optical modulator includes a quartz crystal AT vibrator that performs thickness-shear vibration, and a diffraction grating including a plurality of grooves arranged in a displacement direction of the vibrator. In this optical modulator, since the thickness-shear vibration is in-plane vibration, that is, vibration in a direction intersecting an incident direction of the incident laser light, it is difficult to modulate the frequency of the laser light. In other words, in order to efficiently modulate the frequency of the laser light, it is required that an inner product of a difference between an incident wave vector and an emission wave vector of the laser light and a vibration vector of the quartz crystal AT vibrator is sufficiently large. However, when only the quartz crystal AT vibrator is used, the inner product is substantially zero. Therefore, in the optical modulator described in Patent Literature 1, a diffraction grating is combined with the quartz crystal AT vibrator. The diffraction grating has grooves in a direction intersecting the vibration direction of the quartz crystal AT vibrator. Accordingly, a direction of the vibration vector is converted, the above-described inner product can be made to exceed zero, and the frequency modulation of the laser light is possible.

However, provision of a diffraction grating increases a degree of difficulty in manufacturing an optical modulator and increases a cost of a laser interferometer. Therefore, it is an object to provide a laser interferometer using an optical modulator that enables frequency modulation of laser light without using a diffraction grating.

SUMMARY

A laser interferometer according to an application example of the present disclosure includes: a laser light source configured to emit first laser light; an optical modulator including a vibration element that generates a vibration component in a direction intersecting an incident surface of the first laser light, and configured to modulate the first laser light by using the vibration element to generate second laser light including a modulation signal; a photodetector configured to receive the second laser light and third laser light that includes a sample signal generated by the first laser light being reflected by an object, and output a light reception signal; a demodulation circuit configured to demodulate the sample signal from the light reception signal based on a reference signal; and an oscillation circuit configured to operate using the vibration element as a signal source and output the reference signal to the demodulation circuit.

A laser interferometer according to an application example of the present disclosure includes: a laser light source configured to emit first laser light; an optical modulator including a vibration element that generates a vibration component in a direction intersecting an incident surface of the first laser light, and configured to modulate the first laser light by using the vibration element to generate second laser light including a modulation signal; a photodetector configured to receive the first laser light and third laser light that includes the modulation signal and a sample signal generated by the second laser light being reflected by an object, and output a light reception signal; a demodulation circuit configured to demodulate the sample signal from the light reception signal based on a reference signal; and an oscillation circuit configured to operate using the vibration element as a signal source and output the reference signal to the demodulation circuit.

A laser interferometer according to an application example of the present disclosure includes: a laser light source configured to emit first laser light; an optical modulator including a vibration element that generates a vibration component in a direction intersecting an incident surface of third laser light that includes a sample signal generated by the first laser light being reflected by an object, and configured to modulate the third laser light by using the vibration element to generate second laser light including a modulation signal; a photodetector configured to receive the first laser light and the second laser light that includes the sample signal and the modulation signal, and output a light reception signal; a demodulation circuit configured to demodulate the sample signal from the light reception signal based on a reference signal; and an oscillation circuit configured to operate using the vibration element as a signal source and output the reference signal to the demodulation circuit.

BRIEF DESCRIPTION OF THE DRAWINGS

FIG. 2 is a schematic configuration diagram illustrating a sensor head unit shown in FIG. 1.

FIG. 7 is a cross-sectional view illustrating an optical modulator having a package structure.

FIG. 8 is a cross-sectional view illustrating a modification of the package structure in FIG. 7.

FIG. 9 is a cross-sectional view illustrating another modification of the package structure in FIG. 7.

DESCRIPTION OF EXEMPLARY EMBODIMENTS

Figure 1:
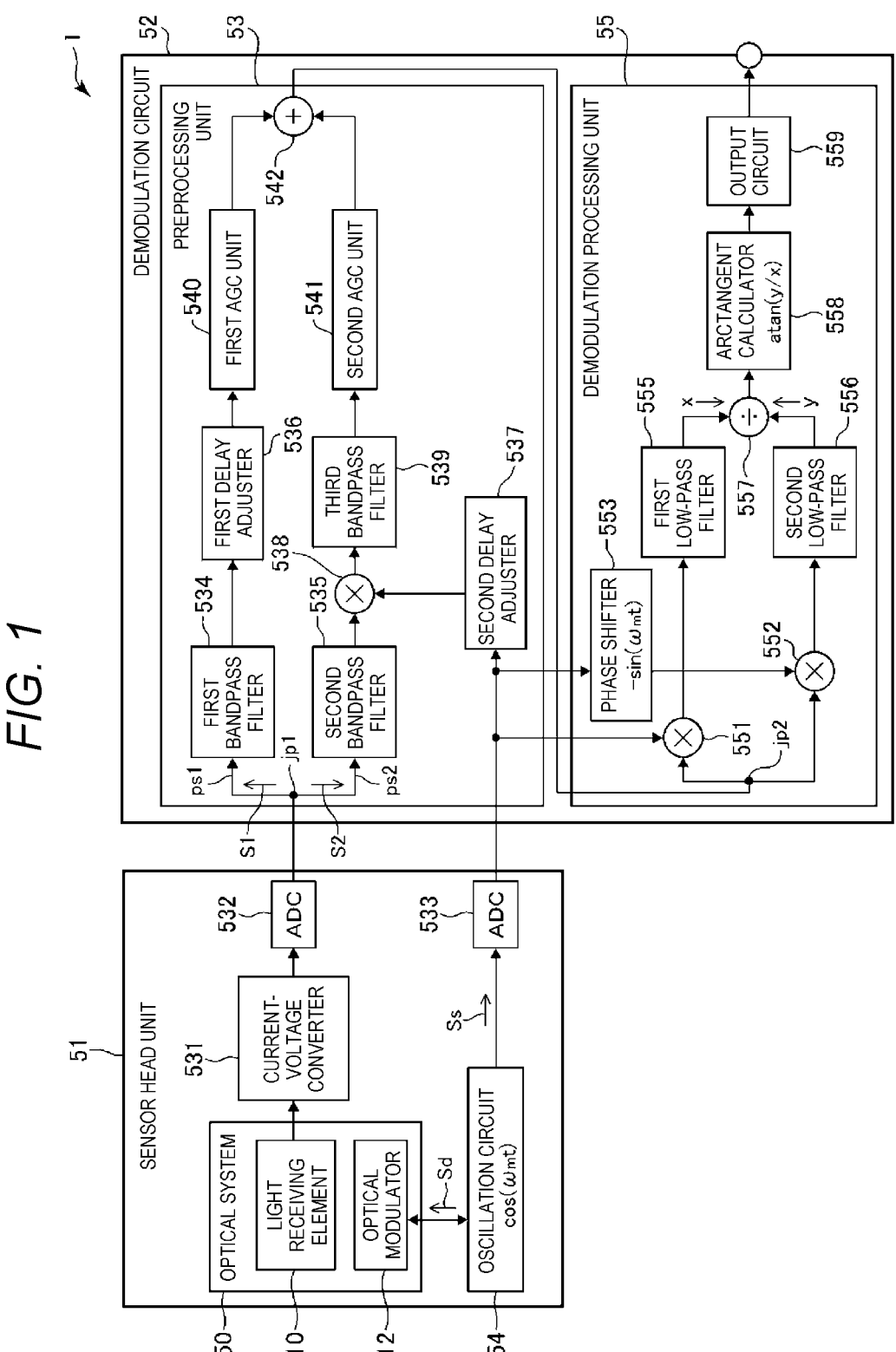
FIG. 1 is a functional block diagram illustrating a laser interferometer according to an embodiment.

Hereinafter, a laser interferometer according to an aspect of the present disclosure will be described in detail based on embodiments illustrated in the accompanying drawings. FIG. 1 is a functional block diagram illustrating a laser interferometer 1 according to an embodiment.

The laser interferometer 1 illustrated in FIG. 1 includes a sensor head unit 51, and a demodulation circuit 52 to which a light detection signal from an optical system 50 is input. The sensor head unit 51 includes the optical system 50, a current-voltage converter 531, and an oscillation circuit 54. The laser interferometer 1 irradiates a moving object 14 with laser light, and detects and analyzes reflected light. Accordingly, displacement and speed of the object 14 is measured.

1. Sensor Head Unit

Figure 2:
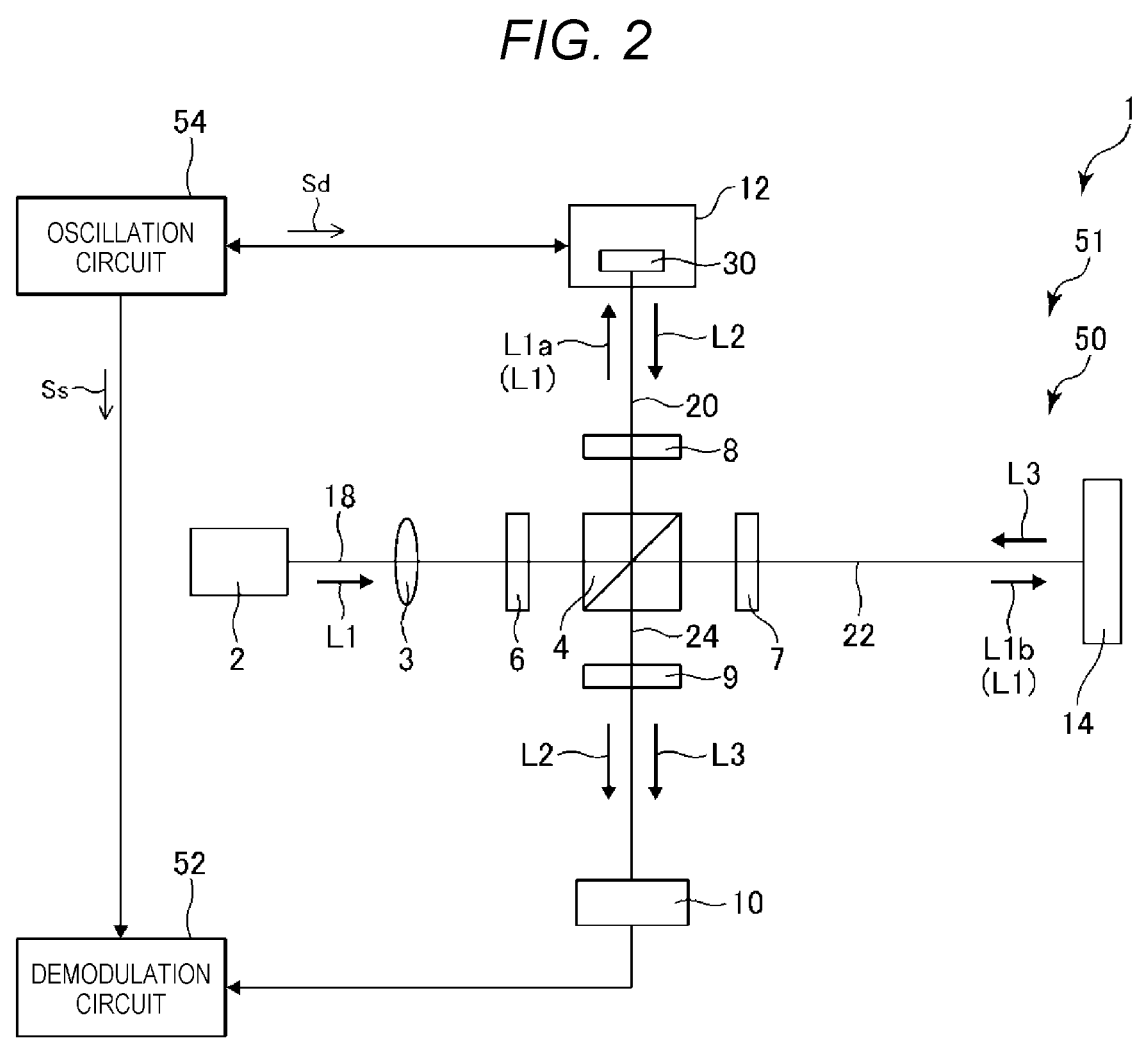

FIG. 2 is a schematic configuration diagram illustrating the sensor head unit 51 shown in FIG. 1.

1.1 Optical System

As illustrated in FIG. 2, the optical system 50 includes a laser light source 2, a collimator lens 3, a light splitter 4, a half-wavelength plate 6, a quarter-wavelength plate 7, a quarter-wavelength plate 8, an analyzer 9, a photodetector 10, and a frequency shifter type optical modulator 12.

The laser light source 2 emits emission light L1 (first laser light). The photodetector 10 converts received light into an electric signal. The optical modulator 12 includes a vibration element 30, and changes a frequency of the emission light L1 to generate reference light L2 (second laser light) including a modulation signal. The emission light L1 incident on the object 14 is reflected as object light L3 (third laser light) including a sample signal that is a Doppler signal derived from the object 14.

An optical path coupling the light splitter 4 and the laser light source 2 is defined as an optical path 18. An optical path coupling the light splitter 4 and the optical modulator 12 is defined as an optical path 20. An optical path coupling the light splitter 4 and the object 14 is defined as an optical path 22. An optical path coupling the light splitter 4 and the photodetector 10 is defined as an optical path 24. An "optical path" in the present specification indicates a path that is provided between optical components and along which light travels.

On the optical path 18, the half-wavelength plate 6 and the collimator lens 3 are arranged in this order from a light splitter 4 side. The quarter-wavelength plate 8 is disposed on the optical path 20. The quarter-wavelength plate 7 is disposed on the optical path 22. The analyzer 9 is disposed on the optical path 24.

The emission light L1 emitted from the laser light source 2 passes through the optical path 18 and is split into two light beams by the light splitter 4. First split light L1a, which is one part of the split emission light L1, is incident on the optical modulator 12 through the optical path 20. Second split light L1b, which is the other part of the split emission light L1, is incident on the object 14 through the optical path 22. The reference light L2, which is generated by the optical modulator 12 modulating the frequency of the emission light L1, is incident on the photodetector 10 through the optical path 20 and the optical path 24. The object light L3 generated by the reflection on the object 14 is incident on the photodetector 10 through the optical path 22 and the optical path 24.

Hereinafter, the components of the optical system 50 will be further described.

1.1.1 Laser Light Source

The laser light source 2 is a laser light source that emits the emission light L1 having coherence. A light source having a line width of a band of MHz or less may be used as the laser light source 2. Specific examples of the laser light source 2 include a gas laser such as a He—Ne laser, and a semiconductor laser element such as a distributed feedback-laser diode (DFB-LD), a fiber bragg grating laser diode (FBG-LD), a vertical cavity surface emitting laser (VCSEL) diode, and a Fabry-Perot laser diode (FP-LD).

In particular, the laser light source 2 is preferably a semiconductor laser element. Accordingly, it is possible to reduce a size of the laser light source 2 in particular. Therefore, it is possible to reduce a size of the laser interferometer 1. In particular, in the laser interferometer 1, since the sensor head unit 51 in which the optical system 50 is accommodated is reduced in size and weight, it is useful in that operability of the laser interferometer 1, such as the degree of installation freedom of the sensor head unit 51, is improved.

1.1.2 Collimator Lens

The collimator lens 3 is an optical element disposed between the laser light source 2 and the light splitter 4. An example of the collimator lens 3 includes an aspherical lens. The collimator lens 3 collimates the emission light L1 emitted from the laser light source 2. When the emission light L1 emitted from the laser light source 2 is sufficiently collimated, for example, when a gas laser such as a He—Ne laser is used as the laser light source 2, the collimator lens 3 may be omitted.

On the other hand, when the laser light source 2 is a semiconductor laser element, the laser interferometer 1 preferably includes the collimator lens 3 disposed between the laser light source 2 and the light splitter 4. Accordingly, the emission light L1 emitted from the semiconductor laser element can be collimated. As a result, since the emission light L1 becomes collimated light, it is possible to prevent an increase in sizes of various optical components that receive the emission light L1, and it is possible to reduce the size of the laser interferometer 1.

When the emission light L1 that became collimated light passes through the half-wavelength plate 6, the emission light L1 is converted into linearly polarized light having an intensity ratio of P-polarized light to S-polarized light of, for example, 50:50, and is incident on the light splitter 4.

1.1.3 Light Splitter

The light splitter 4 is a polarization beam splitter disposed between the laser light source 2 and the optical modulator 12 and between the laser light source 2 and the object 14. The light splitter 4 has a function of transmitting P-polarized light and reflecting S-polarized light. With such a function, the light splitter 4 splits the emission light L1 into first split light L1a that is light reflected by the light splitter 4 and second split light L1b that is light transmitted through the light splitter 4.

The first split light L1a, which is S-polarized light reflected by the light splitter 4, is converted into circularly polarized light by the quarter-wavelength plate 8, and is incident on the optical modulator 12. The first split light L1a incident on the optical modulator 12 is subjected to a frequency shift of $f_m$ [Hz] and is reflected as the reference light L2. Therefore, the reference light L2 includes a modulation signal of a frequency $f_m$ [Hz]. The reference light L2 is converted into P-polarized light when the reference light L2 passes through the quarter-wavelength plate 8 again. The P-polarized light of the reference light L2 passes through the light splitter 4 and the analyzer 9 and is incident on the photodetector 10.

The second split light L1b, which is P-polarized light transmitted through the light splitter 4, is converted into circularly polarized light by the quarter-wavelength plate 7, and is incident on the object 14 in a moving state. The second split light L1b incident on the object 14 is subjected to a Doppler shift of $f_d$ [Hz] and is reflected as the object light L3. Therefore, the object light L3 includes a sample signal of a frequency $f_d$ [Hz]. The object light L3 is converted into S-polarized light when the object light L3 passes through the quarter-wavelength plate 7 again. The S-polarized light of the object light L3 is reflected by the light splitter 4, passes through the analyzer 9, and is incident on the photodetector 10.

As described above, since the emission light L1 is coherent, the reference light L2 and the object light L3 are incident on the photodetector 10 as interference light.

A non-polarization beam splitter may be used instead of the polarization beam splitter. In this case, since the half-wavelength plate 6, the quarter-wavelength plate 7, the quarter-wavelength plate 8, and the like are not necessary, it is possible to reduce the size of the laser interferometer 1 by reducing the number of components. In addition, a light splitter other than a beam splitter may be used.

1.1.4 Analyzer

Since the S-polarized light and the P-polarized light orthogonal to each other are independent of each other, a beat due to interference does not appear by simply superimposing the S-polarized light and the P-polarized light. Therefore, light waves obtained by superimposing the S-polarized light and the P-polarized light passes through the analyzer 9 that is inclined by 45° with respect to both the S-polarized light and the P-polarized light. By using the analyzer 9, it is possible to transmit light having common components and cause the interference. As a result, in the analyzer 9, the reference light L2 and the object light L3 interfere with each other, and interference light having a frequency of $|f_m-f_d|$ [Hz] is generated.

1.1.5 Photodetector

When the interference light is incident on the photodetector 10, the photodetector 10 outputs a photocurrent (light reception signal) corresponding to an intensity of the interference light. By demodulating a sample signal from the light reception signal by a method described later, it is possible to finally obtain movement, that is, displacement and a speed of the object 14. Examples of the photodetector 10 include a photodiode. The light received by the photodetector 10 is not limited to the interference light as long as the light includes the reference light L2 and the object light L3. In the present specification, "demodulating a sample signal from the light reception signal" includes demodulating a sample signal from various signals converted from a photocurrent (light reception signal).

1.1.6 Optical Modulator

Figure 3:
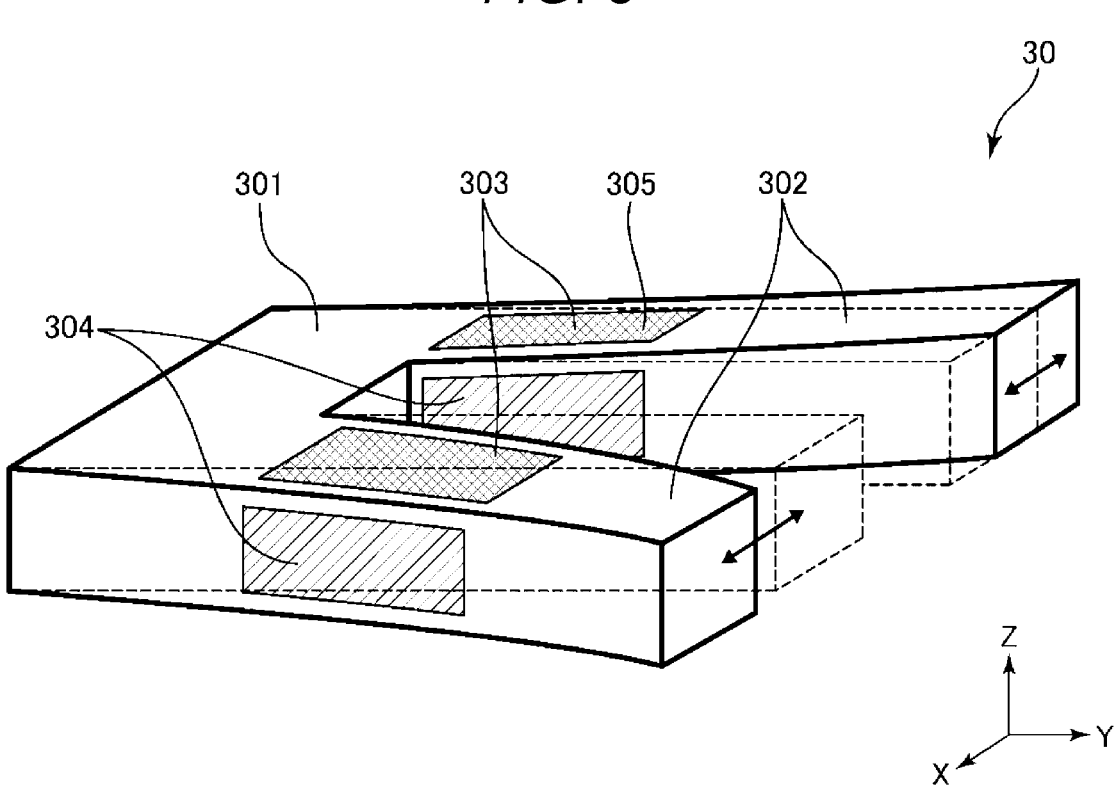
FIG. 3 is a perspective view illustrating a first configuration example of a vibration element provided in an optical modulator shown in FIG. 2.
Figure 4:
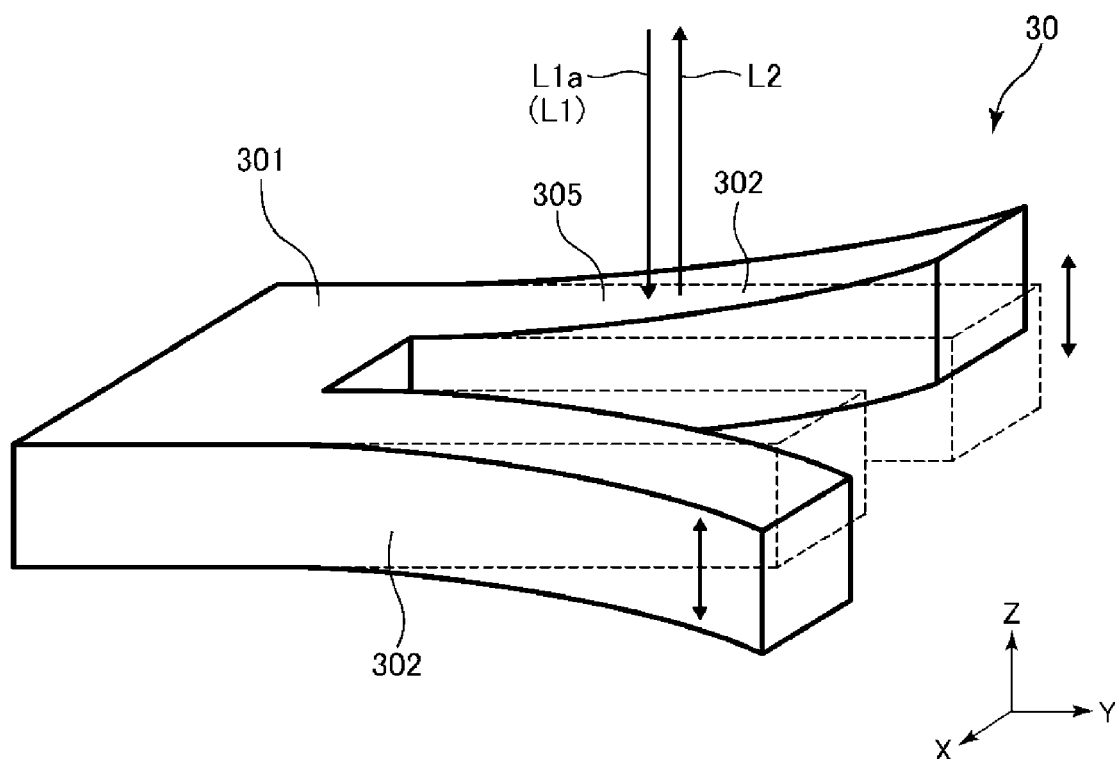
FIG. 4 is another perspective view illustrating the first configuration example of the vibration element provided in the optical modulator shown in FIG. 2.

FIGS. 3 and 4 are perspective views illustrating a first configuration example of the vibration element 30 provided in the optical modulator 12 shown in FIG. 2. In FIGS. 3 and 4, an X axis, a Y axis, and a Z axis are set as three axes orthogonal to one another, and are indicated by arrows. A tip end side of an arrow is defined as "plus", and a base end side of the arrow is defined as "minus". In addition, for example, both a plus side direction and a minus side direction of the X axis are referred to as an "X-axis direction". The same applies to a Y-axis direction and a Z-axis direction.

1.1.6.1 Vibration Element

The frequency shifter type optical modulator 12 includes the vibration element 30. In FIG. 3, as an example, a tuning fork type quartz crystal vibrator is used as the vibration element 30. The vibration element 30 illustrated in FIG. 3 includes a base portion 301, two arms 302 and 302, electrodes 303 and 304, and a light reflecting surface 305.

The base portion 301 is a portion extending along the X-axis. One arm 302 is a portion extending from an end portion of the base portion 301 on the X-axis plus side toward the Y-axis plus side. The other arm 302 is a portion extending from an end portion of the base portion 301 on the X-axis minus side toward the Y-axis plus side.

The electrodes 303 are conductive films provided on surfaces of the arms 302 and 302 that are parallel to an X-Y plane. Although not illustrated in FIG. 3, the electrodes 303 are provided on surfaces facing each other, and are applied with voltages such that polarities thereof are different from each other, thereby driving the arms 302. In FIG. 4, illustration of the electrodes 303 is omitted.

The electrodes 304 are conductive film provided on surfaces of the arms 302 and 302 that intersect the X-Y plane. Although not illustrated in FIG. 3, the electrodes 304 are also provided on surfaces facing each other, and are applied with voltages such that polarities thereof are different from each other, thereby driving the arms 302. In FIG. 4, illustration of the electrodes 304 is omitted.

The light reflecting surface 305 is provided on a surface parallel to the X-Y plane in a tip end portion of the arm 302, and has a function of reflecting the emission light L1. The light reflecting surface 305 illustrated in FIG. 3 is set on a surface of the electrode 303. That is, the electrode 303 has not only a function of applying a voltage to the arm 302 but also a function of serving as the light reflecting surface 305. The light reflecting film may be provided separately from the electrode 303.

A quartz crystal piece cut out from a quartz crystal substrate is used as the tuning fork type quartz crystal vibrator. Examples of the quartz crystal substrate used for manufacturing the tuning fork type quartz crystal vibrator include a quartz crystal Z-cut flat plate.

The vibration element 30, which is a tuning fork type quartz crystal vibrator, has an in-plane flexural vibration mode and an out-of-plane vibration mode.

The in-plane flexural vibration mode is a mode in which vibration in which the two arms 302 and 302 repeatedly approach or separate from each other occurs in the X-Y plane, as indicated by bi-directional arrows in FIG. 3.

Therefore, when the two arms 302 and 302 vibrate in the in-plane flexural vibration mode, the light reflecting surface 305 is hardly displaced in a direction intersecting the X-Y plane. In FIG. 3, an external shape presented at a moment when the two arms 302 and 302 vibrating in the in-plane flexural vibration mode are separated from each other is indicated by a solid line, and an external shape before deformation is indicated by a broken line.

The out-of-plane vibration mode is a vibration mode in which a vibration component in a direction intersecting the light reflecting surface 305 (an incident surface of the emission light L1), that is, in the Z-axis direction in FIG. 4, is generated, as indicated by bi-directional arrows in FIG. 4. In the present specification, vibration having such a vibration component is also referred to as "out-of-plane vibration". The out-of-plane vibration is not limited to vibration in the Z-axis direction. Any vibration having a vibration component intersecting the light reflecting surface 305 may be used regardless of a vibration direction thereof.

At the time of vibrating in the out-of-plane vibration mode, the light reflecting surface 305 is displaced sufficiently greatly in the direction intersecting the X-Y plane. Examples of the out-of-plane vibration include "out-of-plane in-phase flexural vibration" in which the two arms 302 and 302 are displaced in the same phase to the Z-axis plus side or the Z-axis minus side, "out-of-plane reverse-phase flexural vibration" in which the two arms 302 and 302 are displaced in opposite phases to each other, "in-phase torsional vibration" in which the two arms 302 and 302 are twisted in the same phase, and "reverse-phase torsional vibration" in which the two arms 302 and 302 are twisted in opposite phases to each other. In FIG. 4, an external shape of the two arms 302 and 302 performing out-of-plane reverse-phase flexural vibration is indicated by a solid line, and an external shape thereof before deformation is indicated by a broken line. Such an out-of-plane reverse-phase flexural vibration mode is also referred to as a walk mode.

In a general vibrator, when an in-plane flexural vibration mode is set as a main vibration mode, an out-of-plane vibration mode such as a walk mode is treated as a subsidiary vibration mode. In this case, the main vibration mode is used as, for example, an oscillation mode for a clock source, and the subsidiary vibration mode is avoided as spurious or is suppressed and is not used.

On the other hand, in the present embodiment, the light reflecting surface 305 is displaced in the Z-axis direction by actively exciting instead of suppressing the out-of-plane vibration mode. Accordingly, as illustrated in FIG. 4, when the emission light L1 is incident on the light reflecting surface 305, the light reflecting surface 305 can be vibrated in a direction parallel to the incident direction, and thus interaction between the vibration of the light reflecting surface 305 and the frequency of the emission light L1 increases. As a result, it is possible to provide the optical modulator 12 capable of modulating the frequency of the emission light L1, without using a diffraction grating that is necessary for an optical modulator in the related art. Accordingly, it is possible to lower a degree of difficulty in manufacturing the optical modulator 12 by an amount corresponding to non-necessity of the diffraction grating, and it is possible to reduce a cost of the laser interferometer 1.

Figures 5, 6:
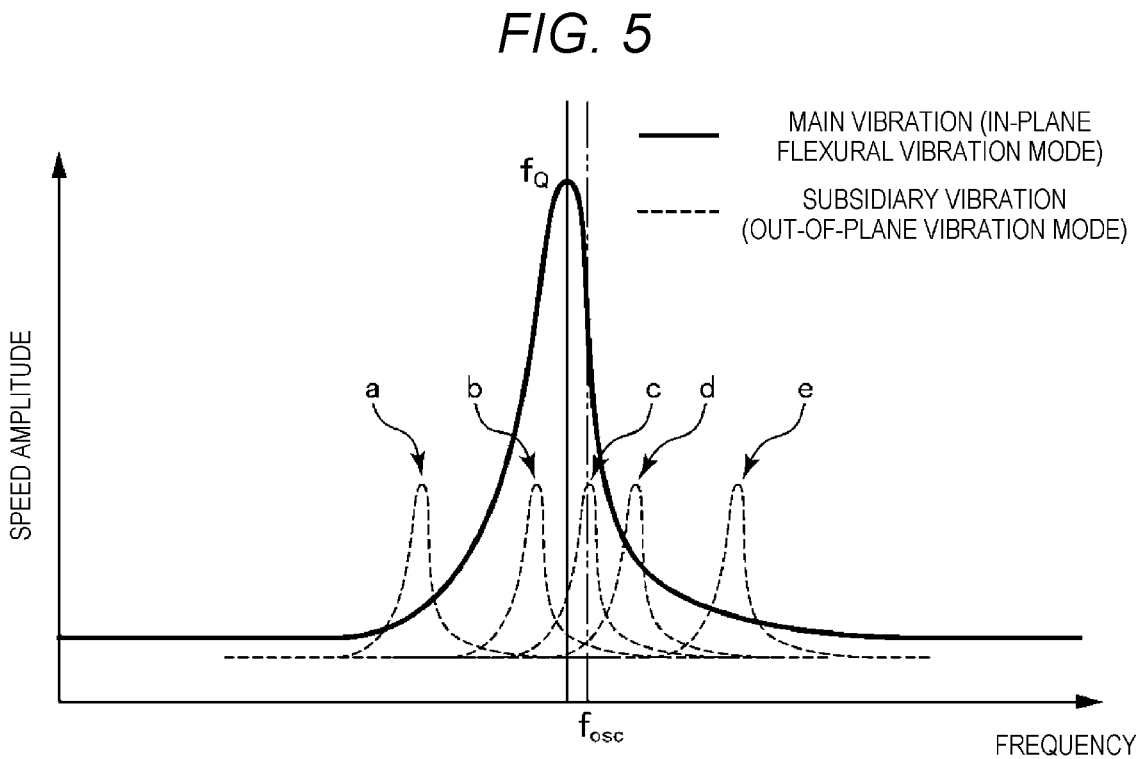
FIG. 5 is a conceptual graph illustrating a frequency characteristic of a main vibration mode (in-plane flexural vibration mode) and a frequency characteristic of a subsidiary vibration mode (out-of-plane vibration mode).
FIG. 6 is a side view illustrating a second configuration example of the vibration element provided in the optical modulator shown in FIG. 2.

FIG. 5 is a conceptual graph illustrating a frequency characteristic of a main vibration mode (in-plane flexural vibration mode) and a frequency characteristic of a subsidiary vibration mode (out-of-plane vibration mode). In FIG. 5, a horizontal axis indicates a frequency of vibration, and a vertical axis indicates a speed amplitude of the vibration. In the present specification, a characteristic represented by a curve indicating frequency dependence of the speed amplitude of the vibration illustrated in FIG. 5 is referred to as a "frequency characteristic" of each vibration mode.

The main vibration mode is excited according to a drive signal Sd output from the oscillation circuit 54. A frequency at which the vibration element 30 is excited by the oscillation circuit 54 is set as an oscillation frequency $f_{osc}$. In addition, a natural frequency of the main vibration mode of a single vibration element 30 is set as $f_Q$. On the other hand, natural frequencies of a plurality of subsidiary vibration modes present in the single vibration element 30 are set as a, b, c, d, and e.

The oscillation frequency $f_{osc}$ of the oscillation circuit 54 is a value corresponding to the natural frequency $f_Q$ of the vibration element 30. In the example in FIG. 5, a frequency slightly larger than the natural frequency $f_Q$ is the oscillation frequency $f_{osc}$. The frequency characteristic of the main vibration mode is represented by a curve having a peak at the natural frequency $f_Q$ and decreasing toward both sides.

On the other hand, in the example in FIG. 5, there are five types of subsidiary vibration modes, and the natural frequencies a, b, c, d, and e are distributed on both sides of the natural frequency $f_Q$. Frequency characteristics of the subsidiary vibration modes are represented by curves having peaks at the respective natural frequencies a, b, c, d, and e and decreasing toward both sides.

Among the frequency characteristics of the subsidiary vibration modes, the frequency characteristics having peaks at the natural frequencies b, c, and d each have a curve partially overlapping the oscillation frequency $f_{osc}$. In this case, the subsidiary vibration modes of the natural frequencies b, c, and d are coupled to the main vibration mode in terms of energy and are excited. Therefore, when the oscillation frequency $f_{osc}$ of the oscillation circuit 54 is set such that the main vibration mode is excited, these subsidiary vibration modes can also be excited. On the other hand, in the frequency characteristics having peaks at the natural frequencies a and e, the curves thereof do not overlap the oscillation frequency $f_{osc}$. Therefore, these subsidiary vibration modes are not excited since these subsidiary vibration modes are not coupled to the main vibration mode.

As described above, a magnitude of optical modulation performed by the optical modulator 12 is determined by an inner product of a vibration vector of the light reflecting surface 305 and a difference between an incident wave vector of the emission light L1 incident on the light reflecting surface 305 and a wave vector of the reference light L2 emitted from the optical modulator 12. Therefore, when the main vibration mode is the in-plane flexural vibration mode as in the tuning fork type quartz crystal vibrator, the light reflecting surface 305 can be vibrated in the Z-axis direction (direction intersecting the incident surface of the emission light L1) by exciting the out-of-plane vibration mode that is the subsidiary vibration mode. That is, the out-of-plane vibration mode coupled to the in-plane flexural vibration mode can be actively excited.

When the emission light L1 is incident on the light reflecting surface 305 in a state where the light reflecting surface 305 vibrates in the Z-axis direction, the frequency of the emission light L1 is modulated by a Doppler effect and is emitted as the reference light L2. At this time, an inner product of a vibration vector of the light reflecting surface 305 and a difference between an incident wave vector of the emission light L1 and an emission wave vector of the reference light L2 exceeds zero and is sufficiently large.

Accordingly, efficiency of optical modulation performed by the optical modulator 12 can be increased without using a diffraction grating. As a result, it is possible to lower the degree of difficulty in manufacturing the optical modulator 12, and thus it is possible to easily reduce costs of the optical modulator 12 and the laser interferometer 1.

The natural frequency of the subsidiary vibration mode can be adjusted according to a change in a structure of the vibration element 30, for example, a change in a length, a thickness, and various shapes such as a cross-sectional shape of the arms 302 and 302, and arrangement of the electrodes 303 and 304. That is, the structure of the vibration element 30 may be adjusted so as to provide the natural frequencies b, c, and d close to the natural frequency $f_Q$ of the main vibration mode. A specific structure can be found by performing an experiment or simulation. As an example, when the cross-sectional shapes of the arms 302 and 302 are both not a rectangle but a parallelogram, the subsidiary vibration mode is easily excited. By changing the shape of the parallelogram, the natural frequency of the subsidiary vibration mode can be adjusted.

The out-of-plane reverse-phase flexural vibration is more useful than the out-of-plane in-phase flexural vibration. The latter has higher oscillation reproducibility than the former. Further, the latter has an advantage that the vibration element 30 can be easily designed because the vibration mode can be easily brought close to the main vibration mode.

A length of the vibration element 30 in the Y-axis direction is, for example, about 0.2 mm or more and 5.0 mm or less. A thickness of the vibration element 30 in the Z-axis direction is, for example, about 0.003 mm or more and 0.5 mm or less.

A shape of the tuning fork type quartz crystal vibrator is not limited to a two-legged tuning fork type having two arms 302 and 302 as illustrated in FIGS. 3 and 4, and examples of the shape include a cantilever beam shape of a three-legged tuning fork type and a four-legged tuning fork type.

When the drive signal Sd is supplied (AC voltage is applied) from the oscillation circuit 54 shown in FIGS. 1 and 2 to the vibration element 30 shown in FIG. 3, the vibration element 30 oscillates. Electric power (driving power) required for the oscillation of the vibration element 30 is not particularly limited, and is as small as about 0.1 µW to 100 mW. Therefore, the drive signal Sd output from the oscillation circuit 54 can be used to cause the vibration element 30 to oscillate without being amplified.

In addition, in an acousto-optic modulator (AOM) or an electro-optic modulator (EOM) that is an optical modulator in the related art, a structure for maintaining a temperature of the optical modulator may be necessary, and thus it is difficult to reduce a volume of the optical modulator in the related art. In addition, since these optical modulators have large electric power consumption, it may be difficult to reduce the size and electric power consumption of the laser interferometer. Meanwhile, since a volume of the vibration element 30 is fairly small and the electric power required for the oscillation is small, a size and electric power consumption of the laser interferometer 1 can be easily reduced in the present configuration example.

The vibration element 30 is not limited to the tuning fork type quartz crystal vibrator, and may be another quartz crystal vibrator having an out-of-plane vibration mode such as a quartz crystal AT vibrator or a stress-compensated (SC) cut quartz crystal vibrator.

A main vibration mode of the quartz crystal AT vibrator is a mode in which thickness shear vibration occurs, but an out-of-plane vibration mode can be excited by optimizing a structure of the vibration element such as a shape of a quartz crystal piece and arrangement of electrodes.

A main vibration mode of the SC cut quartz crystal vibrator is also a mode in which thickness shear vibration occurs, but the SC cut quartz crystal vibrator has an out-of-plane vibration mode at a predetermined ratio. Here, when a ratio of the thickness shear vibration mode is set as m1, a ratio of the out-of-plane vibration mode is set as m3, and a ratio of other modes is set as m2, m1:m2:m3 is, for example, about 7:1:2. As the SC cut quartz crystal vibrator, a quartz crystal piece cut out from a quartz crystal SC cut flat plate is used.

FIG. 6 is a side view illustrating a second configuration example of the vibration element 30 provided in the optical modulator 12 shown in FIG. 2. In FIG. 6, an X axis, a Y axis, and a Z axis are set as three axes orthogonal to one another, and are indicated by arrows. A tip end side of an arrow is defined as "plus", and a base end side of the arrow is defined as "minus". In addition, for example, both a plus side direction and a minus side direction of the Y axis are referred to as a "Y-axis direction".

In FIG. 6, an SC cut quartz crystal vibrator is used as the vibration element 30. The vibration element 30 illustrated in FIG. 6 generates a vibration component in a thickness direction of a quartz crystal piece, that is, in a Z-axis direction, as indicated by bi-directional arrows in FIG. 6. Accordingly, the light reflecting surface 305 vibrates in the Z-axis direction. In FIG. 6, an external shape of the SC cut quartz crystal vibrator vibrating in an out-of-plane vibration mode is illustrated.

In addition, the vibration element 30 is not limited to the quartz crystal vibrator, and may be a silicon vibrator or a ceramic vibrator as long as the vibrator has an out-of-plane vibration mode. The quartz crystal vibrator, the silicon vibrator, and the ceramic vibrator are different from other vibrators such as a piezoelectric element, and are vibrators using a resonance phenomenon, and thus have a high Q value and can easily have a stabilized natural frequency. In the present specification, such a vibrator using a resonance phenomenon based on a high Q value is referred to as a "self-excited oscillation vibrator". By using the self-excited oscillation vibrator as the vibration element 30, a modulation signal can be stabilized, and the oscillation circuit 54 operating with the vibration element 30 as a signal source can output a reference signal Ss having higher accuracy. In addition, both the modulation signal and the reference signal Ss are processed in real time by the demodulation circuit 52. For this reason, even if both signals are subjected to disturbances, the disturbances are offset or reduced by each other, and processing results thereof are less likely to be affected. Therefore, a sample signal derived from the object 14 can be demodulated at a high S/N ratio (signal-to-noise ratio), and the laser interferometer 1 capable of measuring speed and displacement of the object 14 with higher accuracy can be provided.

In addition, the out-of-plane vibration has a lower natural frequency than the in-plane flexural vibration. Therefore, according to the present embodiment in which the out-of-plane vibration mode is used, frequencies of the light reception signal and the reference signal Ss can be lowered as compared with those in a laser interferometer using a related-art optical modulator using an in-plane flexural vibration mode. Specifically, a natural frequency of the in-plane flexural vibration is often 1 MHz or more, for example, whereas a natural frequency of the out-of-plane vibration is often less than 1 MHz, for example. Accordingly, it is possible to lower a requirement for processing performance of a processor such as an analog-to-digital converter (ADC) or a field-programmable gate array (FPGA) that processes these signals. As a result, the cost of the laser interferometer 1 can be easily reduced.

The silicon vibrator is a vibrator that includes a single crystal silicon piece manufactured from a single crystal silicon substrate by using a micro electro mechanical system (MEMS) technique, and a piezoelectric film. The MEMS refers to a micro electro mechanical system. Examples of a shape of the single crystal silicon piece include a cantilever beam shape of a two-legged tuning fork type vibrator and a three-legged tuning fork type vibrator. An oscillation frequency of the silicon vibrator is, for example, about 1 kHz to several hundreds of MHz.

Further, in the silicon vibrator, a design of setting out-of-plane vibration as main vibration is possible. In this case, for example, a Q value can be further increased by reducing a thickness of the single crystal silicon piece having a cantilever beam shape. The out-of-plane flexural vibration can be excited, for example, depending on an arrangement of the piezoelectric film.

The ceramic vibrator is a vibrator that includes a piezoelectric ceramic piece manufactured by sintering a piezoelectric ceramic, and an electrode. Examples of the piezoelectric ceramic include lead zirconate titanate (PZT) and barium titanate (BTO). An oscillation frequency of the ceramic vibrator is, for example, about several hundreds of kHz to several tens of MHz.

In addition, in the ceramic vibrator, out-of-plane vibration coupled to in-plane vibration such as length vibration and spread vibration in addition to flexural vibration can be used.

1.1.6.2 Package Structure

The optical modulator 12 may have a package structure. FIG. 7 is a cross-sectional view illustrating the optical modulator 12 having a package structure. The package structure refers to a structure in which the vibration element 30 is hermetically sealed in a container 70 (housing) illustrated in FIG. 7.

The optical modulator 12 illustrated in FIG. 7 includes a container 70 having an accommodating portion as an internal space, the vibration element 30 accommodated in the container 70, and a circuit element 45 constituting a part of the oscillation circuit 54.

As illustrated in FIG. 7, the container 70 includes a container body 72 and a lid 74. The container body 72 includes a first recessed portion 721 provided inside the container body 72, and a second recessed portion 722 that is provided at an inner side of the first recessed portion 721 and that is deeper than the first recessed portion 721. The container body 72 is made of a ceramic material, a resin material, or the like. Although not illustrated, the container body 72 includes an internal terminal provided at an inner surface, an external terminal provided at an outer surface, a wiring coupling the internal terminal with the external terminal, and the like.

An opening portion of the container body 72 is closed by the lid 74 via a sealing member such as a seal ring or low-melting glass (not illustrated). The lid 74 is a transmission window through which the emission light L1 and the reference light L2 are transmitted, and is also a member constituting a part of the container 70. As a constituent material of the lid 74, a material capable of transmitting laser light is used, for example, a glass material and a crystal material. The lid 74 is preferably provided with an anti-reflection film.

The accommodating portion of the container 70 is hermetically sealed as described above. Accordingly, the accommodating portion can be maintained in a depressurized state. By reducing a pressure in the accommodating portion, it is possible to reduce air resistance in the out-of-plane vibration of the vibration element 30. Therefore, vibration efficiency of the vibration element 30 accommodated in the accommodating portion can be increased, and the displacement of the light reflecting surface 305 can be further increased. In addition, the oscillation of the vibration element 30 can be stabilized. As a result, the S/N ratio of the modulation signal can be further increased, and finally, the sample signal can be demodulated with a higher S/N ratio.

The pressure of the depressurized accommodating portion is not particularly limited as long as the pressure is less than an atmospheric pressure, and is preferably 100 Pa or less. On the other hand, a lower limit value may be set to about 10 Pa in consideration of maintaining the depressurized state satisfactorily.

The hermetical sealing of the container 70 and the depressurization of the accommodating portion are not essential, and may be omitted.

The vibration element 30 is disposed on a bottom surface of the first recessed portion 721. The vibration element 30 is supported on the bottom surface of the first recessed portion 721 by a bonding member (not illustrated). The internal terminal of the container body 72 and the vibration element 30 are electrically coupled to each other via a conductive material (not illustrated) such as a bonding wire or a bonding metal.

The circuit element 45 is disposed on a bottom surface of the second recessed portion 722. The circuit element 45 is electrically coupled to the internal terminal of the container body 72 via a conductive material such as a bonding wire 76. Accordingly, the vibration element 30 and the circuit element 45 are also electrically coupled to each other via the wiring provided in the container body 72. The circuit element 45 may be provided in a circuit other than the oscillation circuit 54 to be described later.

By adopting such a package structure, the vibration element 30 and the circuit element 45 can be overlapped with each other, and thus a physical distance between the vibration element 30 and the circuit element 45 can be reduced, and a wiring length between the vibration element 30 and the circuit element 45 can be shortened. Therefore, it is possible to prevent noise from entering the drive signal Sd from an outside, or conversely, it is possible to prevent the drive signal Sd from becoming a noise source. In addition, both the vibration element 30 and the circuit element 45 can be protected from an external environment by one container 70. Therefore, it is possible to improve reliability of the laser interferometer 1 while reducing a size of the sensor head unit 51.

In addition, the package structure can suppress outgassing, which is a cause of lowering a degree of vacuum, to be slight as compared with, for example, a case where the entire optical system 50 is hermetically sealed. Accordingly, in the optical modulator 12 adopting the package structure, long-term reliability is easily improved.

Further, the container 70 constituting the package structure described above can be manufactured together with the vibration element 30 by a manufacturing process at a wafer level. Therefore, a manufacturing cost of the optical modulator 12 adopting the package structure can be easily reduced.

A structure of the container 70 is not limited to the illustrated structure, and for example, the vibration element 30 and the circuit element 45 may have separate package structures. In addition, although not illustrated, other circuit elements constituting the oscillation circuit 54 and other circuit elements may be accommodated in the container 70. The container 70 may be provided as necessary, and may be omitted.

Here, modifications of the container 70 will be described. FIGS. 8 and 9 are cross-sectional views illustrating modifications of the package structure of FIG. 7.

A container 70A illustrated in FIG. 8 is the same as the container 70 illustrated in FIG. 7 except that the container 70A includes a through hole 700 provided in a part of the lid 74 and a transmission window 71A fitted into the through hole 700. The transmission window 71A has a surface in a curved shape. Accordingly, the transmission window 71A can be provided with not only a function of transmitting the emission light L1 and the reference light L2 but also a function of adjusting traveling directions of the emission light L1 and the reference light L2. As an example, the transmission window 71A can be provided with a function of serving as the collimator lens 3. Accordingly, it is possible to converge the emission light L1 and narrow a range of incidence on the light reflecting surface 305. In addition, the reference light L2 can be collimated to narrow a range of incidence on the light splitter 4. As a result, it is possible to reduce a size of the optical system 50. By using the container 70A illustrated in FIG. 8, the collimator lens 3 can be omitted. Accordingly, the number of components of the optical system 50 can be reduced, and the cost of the laser interferometer 1 can be reduced.

Examples of the curved shape include a convex curved shape. In particular, an aspherical shape is preferably used. Accordingly, various aberrations of a lens can be reduced, and accuracy of collimation can be improved.

In addition, a constituent material of the lid 74 used in the container 70A does not need to be a material capable of transmitting laser light, and may be a material that does not transmit laser light. The transmission window 71A is preferably provided with an anti-reflection film.

A container 70B illustrated in FIG. 9 is the same as the container 70A illustrated in FIG. 8 except that the container 70B includes the through hole 700 provided in a part of the lid 74 and a transmission window 71B fitted into the through hole 700. The transmission window 71B is made of a material capable of transmitting laser light, and has a flat plate shape. The transmission window 71B is provided in a posture inclined with respect to an incident direction of the emission light L1, that is, in a posture inclined such that an incident angle of the emission light L1 with respect to a main surface 711 (a surface on which the emission light L1 is incident) is more than 0°. Accordingly, even if the emission light L1 incident on the main surface 711 is reflected by the main surface 711 and reflected light L4 is generated, probability that the reflected light L4 is incident on the photodetector 10 can be lowered. When the reflected light L4 is incident on the photodetector 10, the reflected light L4 causes a decrease in an S/N ratio of a light reception signal. Therefore, by using the container 70B having the transmission window 71B provided in an inclined posture, it is possible to prevent a decrease in an S/N ratio of the light reception signal.

In FIG. 9, the main surface 711 at the time when an incident angle of the emission light L1 is 0° is set as a reference surface, and an inclination angle θ of the main surface 711 with respect to the reference surface is illustrated. In this case, the incident angle is 20. Then, when a diameter of an effective light receiving surface of the photodetector 10 is set as $\varphi_D$ and a distance between the optical modulator 12 and the photodetector 10 is set as $L_{md}$, the inclination angle θ may be set so as to satisfy the following formula.

$$\frac{\phi_D}{2} < L_{md}\tan 2\theta \cong 2L_{md}\theta$$

Accordingly, it is possible to prevent the reflected light L4 generated at the main surface 711 from being received by the photodetector 10. As a result, even if the reflected light L4 is generated, it is possible to prevent a decrease in an S/N ratio of the light reception signal. For example, when the diameter $\varphi_D$ is 0.8 mm and the distance $L_{md}$ is 10 mm, the inclination angle θ may be 1.1° or more. As an example, the inclination angle θ is preferably 0.05° or more and 5.0° or less, and more preferably 0.10° or more and 2.0° or less. The transmission window 71B is preferably provided with an anti-reflection film.

1.2 Hermetically Sealed Structure

Although a package structure for hermetically sealing the optical modulator 12 is illustrated in FIGS. 7 to 9, a part or all of the sensor head unit 51 may have a hermetically sealed structure.

Figure 10:
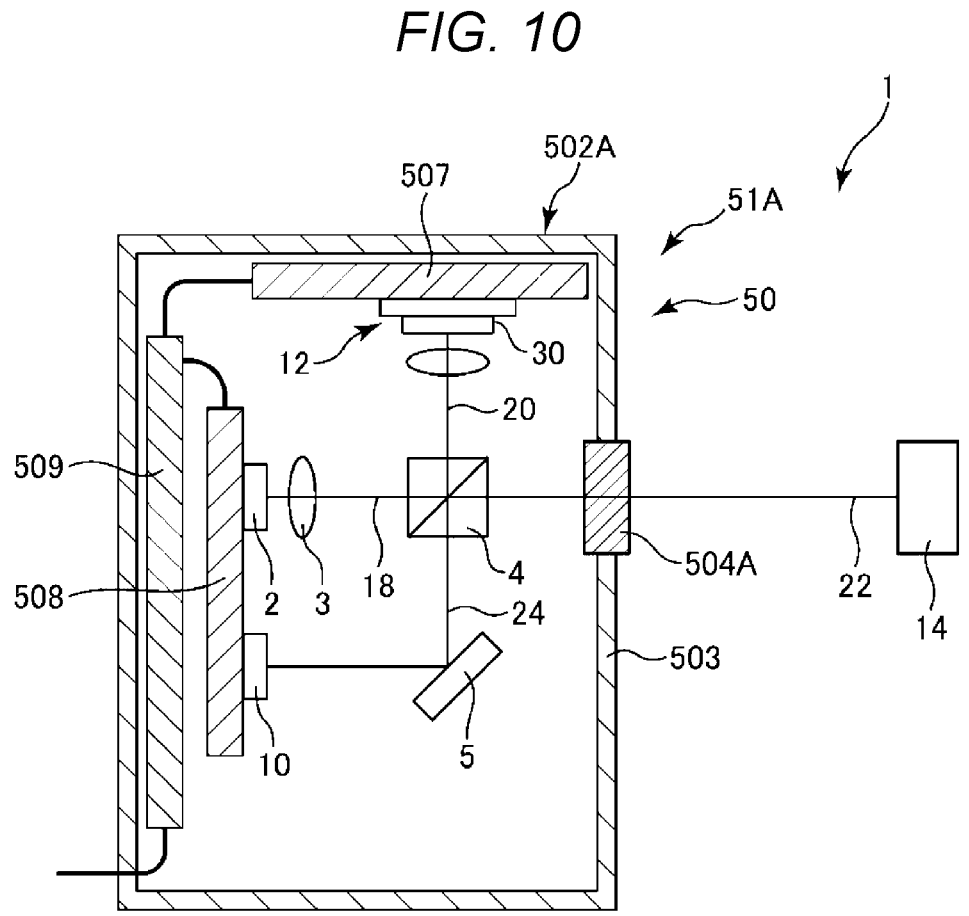
FIG. 10 is a cross-sectional view illustrating a modification of the sensor head unit in FIG. 1.
Figure 11:
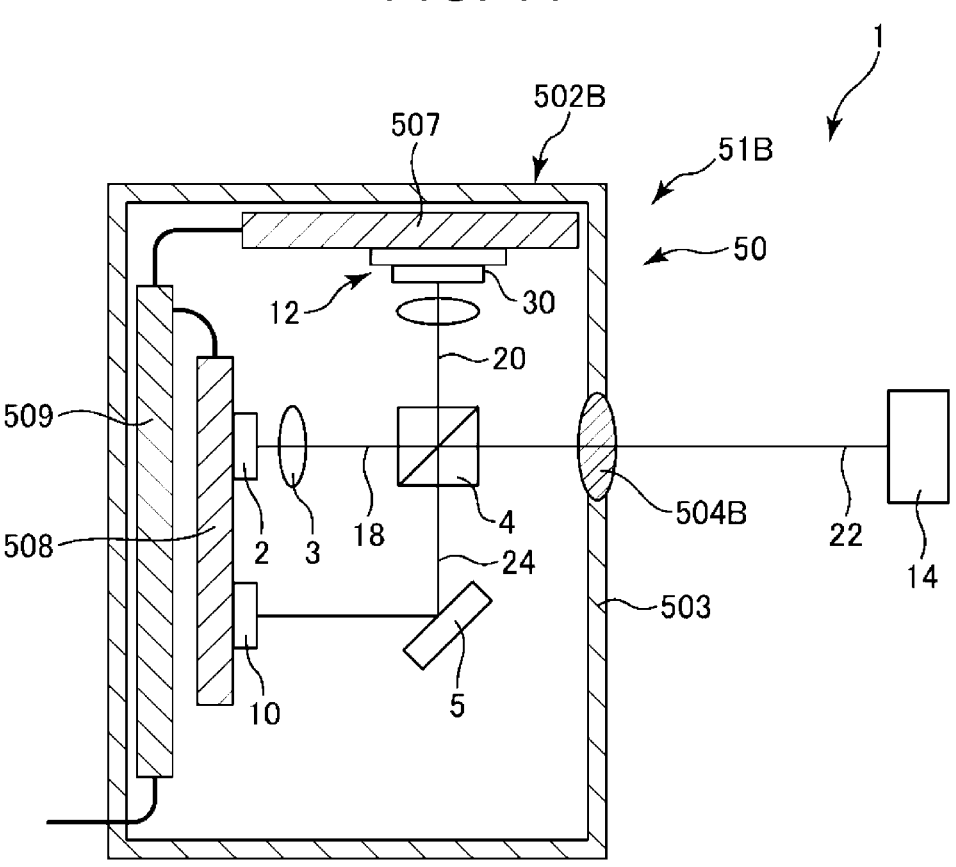
FIG. 11 is a cross-sectional view illustrating another modification of the sensor head unit in FIG. 1.
Figure 12:
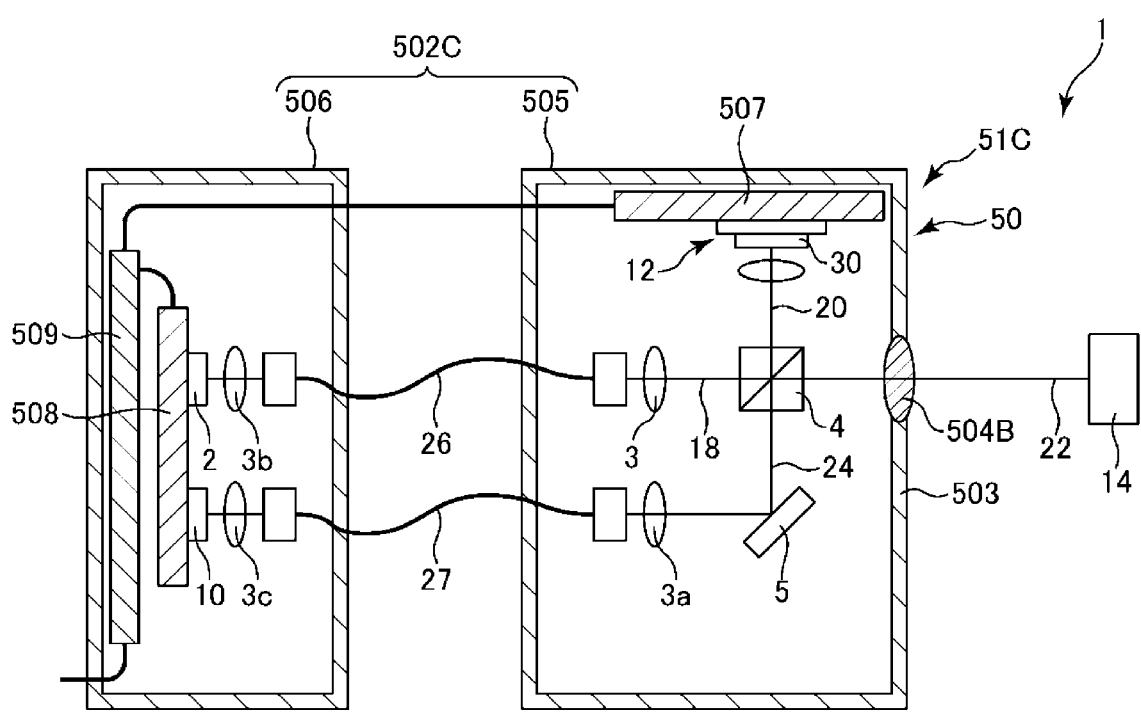
FIG. 12 is a cross-sectional view illustrating another modification of the sensor head unit in FIG. 1.

FIGS. 10 to 12 are cross-sectional views illustrating modifications of the sensor head unit 51 of FIG. 1. The hermetically sealed structure refers to a structure in which at least the optical modulator 12 is hermetically sealed in cases 502A, 502B, and 502C (housings) illustrated in FIGS. 10 to 12.

A sensor head unit 51A illustrated in FIG. 10 includes the case 502A having an accommodating portion as an internal space, the optical system 50 accommodated in the case 502A, and wiring boards 507, 508, and 509. In FIG. 10, a part of the optical elements provided in the optical system 50 are omitted.

As illustrated in FIG. 10, the case 502A includes a case body 503 and a transmission window 504A. The case body 503 is made of a metal material, a resin material, or the like.

The transmission window 504A is fitted into a hole provided in the case body 503. As a constituent material of the transmission window 504A, a material capable of transmitting laser light is used, for example, a glass material and a crystal material. The transmission window 504A may have the same configuration and function as those of the transmission window 71B described above. That is, the transmission window 504A may be provided in a posture inclined with respect to a reference surface, or may be provided in a posture not inclined with respect to the reference surface. In the former case, generation of the reflected light L4 can be prevented.

The wiring board 507 supports the optical modulator 12 and is electrically coupled to the optical modulator 12. The wiring board 508 supports the photodetector 10 and the laser light source 2, and is electrically coupled to the photodetector 10 and the laser light source 2. The wiring board 509 is electrically coupled to the wiring boards 507 and 508, and is electrically coupled to an outside. The "being electrically coupled" refers to being coupled by an electric power line and a communication line.

A reflecting element 5 is added to the optical system 50 illustrated in FIG. 10. The reflecting element 5 is disposed on the optical path 24 and changes traveling directions of the reference light L2 and the object light L3.

A sensor head unit 51B illustrated in FIG. 11 includes the case 502B having an accommodating portion as an internal space, the optical system 50 accommodated in the case 502B, and the wiring boards 507, 508, and 509. In FIG. 11, a part of the optical elements provided in the optical system 50 are omitted.

As illustrated in FIG. 11, the case 502B includes the case body 503 and a transmission window 504B. The transmission window 504B is fitted into a hole provided in the case body 503. The transmission window 504B has the same configuration and function as those of the transmission window 71A described above. That is, the transmission window 504B is provided with a function of serving as the collimator lens 3.

A sensor head unit 51C illustrated in FIG. 12 includes the case 502C having an accommodating portion as an internal space, the optical system 50 accommodated in the case 502C, and the wiring boards 507, 508, and 509. In FIG. 12, a part of the optical elements provided in the optical system 50 are omitted.

As illustrated in FIG. 12, the case 502C includes a first case 505 and a second case 506. In addition, collimator lenses 3a, 3b, and 3c and optical fibers 26 and 27 are added in the optical system 50 illustrated in FIG. 12.

The first case 505 includes the case body 503 and the transmission window 504B. The collimator lens 3, the collimator lens 3a, the light splitter 4, the reflecting element 5, and the optical modulator 12 of the optical system 50 and the wiring board 507 are accommodated in an accommodating portion of the first case 505. On the other hand, the laser light source 2, the photodetector 10, the collimator lens 3b, and the collimator lens 3c of the optical system 50 and the wiring boards 508 and 509 are accommodated in an accommodating portion of the second case 506.

The optical fibers 26 and 27 have a large part thereof disposed outside, and optically couple the accommodating portion of the first case 505 and the accommodating portion of the second case 506.

On the optical path 18 coupling the light splitter 4 and the laser light source 2, the collimator lens 3, the optical fiber 26, and the collimator lens 3b are arranged in this order from a light splitter 4 side. On the optical path 24 coupling the light splitter 4 and the photodetector 10, the reflecting element 5, the collimator lens 3a, the optical fiber 27, and the collimator lens 3c are arranged in this order from the light splitter 4 side.

The accommodating portions of the cases 502A, 502B, and 502C are preferably hermetically sealed. Accordingly, the accommodating portions can be maintained in a depressurized state. By reducing a pressure in the accommodating portion, it is possible to reduce air resistance in out-of-plane vibration of the vibration element 30 accommodated in the accommodating portion even when the optical modulator 12 does not have a package structure. Therefore, vibration efficiency of the vibration element 30 can be increased, and displacement of the light reflecting surface 305 can be further increased. As a result, an S/N ratio of a modulation signal can be further increased, and finally, a sample signal can be demodulated with a higher S/N ratio.

In addition, due to the cases 502A, 502B, and 502C, the laser light source 2 can also be held under a reduced pressure. Accordingly, it is possible to prevent deterioration of the laser light source 2 caused by a change in humidity or atmospheric pressure. Specifically, it is possible to prevent fluctuation of an oscillation wavelength or the like.

A part of the optical elements constituting the optical system 50 may be disposed outside the cases 502A, 502B, and 502C.

1.3 Current-Voltage Converter

The current-voltage converter 531 is also called a transimpedance amplifier (TIA), and converts a photocurrent (a light reception signal) output from the photodetector 10 into a voltage signal and outputs the voltage signal as a light detection signal.

An ADC 532 illustrated in FIG. 1 is disposed between the current-voltage converter 531 and the demodulation circuit 52. The ADC 532 is an analog-to-digital converter, and converts an analog signal into a digital signal at a predetermined sampling bit rate. The ADC 532 is provided in the sensor head unit 51.

The optical system 50 may include a plurality of photodetectors 10. In this case, a differential amplifier circuit is provided between the plurality of photodetectors 10 and the current-voltage converter 531, so that it is possible to perform differential amplification processing on a photocurrent and increase an S/N ratio of a light detection signal. The differential amplification processing may be performed on a voltage signal.

1.4 Oscillation Circuit

The oscillation circuit 54 outputs the drive signal Sd to the vibration element 30. The oscillation circuit 54 outputs the reference signal Ss to the demodulation circuit 52.

Figure 13:
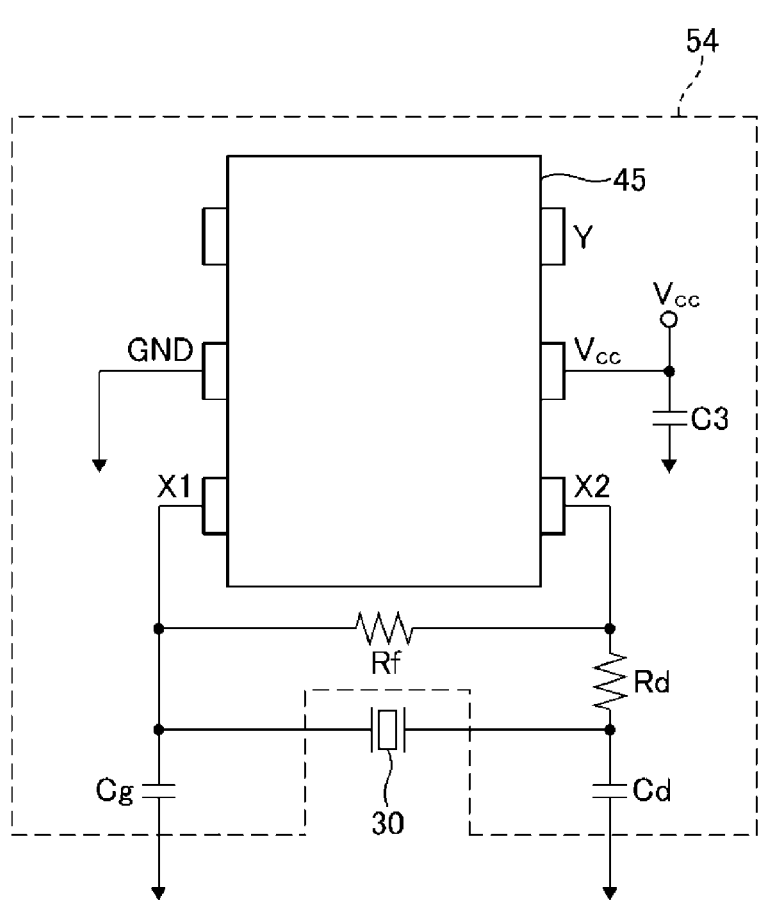
FIG. 13 is a circuit diagram illustrating a configuration of a one-stage inverter oscillation circuit.

The oscillation circuit 54 is not particularly limited as long as the oscillation circuit 54 is a circuit capable of oscillating the vibration element 30, and circuits having various configurations are used. FIG. 13 is a circuit diagram illustrating a configuration of a one-stage inverter oscillation circuit as an example of a circuit configuration.

The oscillation circuit 54 illustrated in FIG. 13 includes the circuit element 45, a feedback resistor Rf, a limiting resistor Rd, a first capacitor Cg, a second capacitor Cd, and a third capacitor C3.

The circuit element 45 is an inverter IC. A terminal X1 and a terminal X2 of the circuit element 45 are terminals coupled to an inverter inside the circuit element 45. A terminal GND is coupled to a ground potential, and a terminal Vcc is coupled to a power supply potential. A terminal Y is a terminal for oscillation output.

The first capacitor Cg is coupled between the terminal X1 and the ground potential. The limiting resistor Rd and the second capacitor Cd coupled in series to each other are coupled in this order from a terminal X2 side, between the terminal X2 and the ground potential. Further, one end of the feedback resistor Rf is coupled between the terminal X1 and the first capacitor Cg, and the other end of the feedback resistor Rf is coupled between the terminal X2 and the limiting resistor Rd.

One end of the vibration element 30 is coupled between the first capacitor Cg and the feedback resistor Rf, and the other end of the vibration element 30 is coupled between the second capacitor Cd and the limiting resistor Rd. Accordingly, the vibration element 30 serves as a signal source of the oscillation circuit 54.

Figure 14:
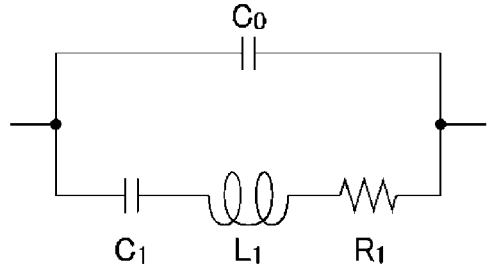
FIG. 14 illustrates an example of an LCR equivalent circuit of the vibration element.

FIG. 14 illustrates an example of an LCR equivalent circuit of the vibration element 30.

As illustrated in FIG. 14, the LCR equivalent circuit of the vibration element 30 includes a series capacitance $C_1$, a series inductance $L_1$, an equivalent series resistance $R_1$, and a parallel capacitance $C_0$.

In the oscillation circuit 54 illustrated in FIG. 13, when a capacitance of the first capacitor Cg is set as $C_g$ and a capacitance of the second capacitor Cd is set as $C_d$, a load capacitance $C_L$ is given by the following formula (a).

$$C_L = \frac{C_d C_g}{C_d + C_g} \tag{a}$$

Then, the oscillation frequency $f_{osc}$, which is a frequency of a signal output from the terminal Y of the oscillation circuit 54, is given by the following formula (b).

$$f_{osc} = f_Q \sqrt{1 + \frac{C_1}{C_0 + C_L}} \tag{b}$$

$f_Q$ is a natural frequency of the vibration element 30.

According to the above formula (b), it can be seen that the oscillation frequency $f_{osc}$ of a signal output from the terminal Y can be finely adjusted by appropriately changing the load capacitance $C_L$.

A difference $\Delta f$ between the natural frequency $f_Q$ of the vibration element 30 and the oscillation frequency $f_{osc}$ of the oscillation circuit 54 is given by the following formula (c).

$$\Delta f = f_{osc} - f_Q = f_Q \left( \sqrt{1 + \frac{C_1}{C_0 + C_L}} - 1 \right) \tag{c}$$

Here, since $C_1 \ll C_0$, and $C_1 \ll C_L$, $\Delta f$ is approximately given by the following formula (d).

$$\Delta f = f_{osc} - f_Q \cong \frac{C_1}{2(C_0 + C_L)} f_Q \tag{d}$$

Therefore, the oscillation frequency $f_{osc}$ of the oscillation circuit 54 has a value corresponding to the natural frequency $f_Q$ of the vibration element 30.

Here, when the vibration element 30 is fixed to, for example, the container 70, the natural frequency $f_Q$ fluctuates if the vibration element 30 receives, via a fixing portion, an expansion stress caused by temperature. In addition, when the vibration element 30 is tilted, the natural frequency $f_Q$ fluctuates under an influence of gravity or the like due to its own weight.

In the oscillation circuit 54, when the natural frequency $f_Q$ fluctuates for such reasons, the oscillation frequency $f_{osc}$ changes in conjunction with the fluctuation according to the formula (d). That is, the oscillation frequency $f_{osc}$ constantly has a value shifted from the natural frequency $f_Q$ by $\Delta f$. Accordingly, the vibration of the vibration element 30 is stabilized, and a displacement amplitude is stabilized. When the displacement amplitude is stabilized, a modulation characteristic of the optical modulator 12 is stabilized, and thus it is possible to further increase an S/N ratio of a modulation signal. As a result, demodulation accuracy of a sample signal in the demodulation circuit 52 can be improved.

For example, it is preferable that $\Delta f = |f_{osc} - f_Q| \leq 3000$ [Hz], and more preferable that $\Delta f \leq 600$ [Hz].

The laser interferometer 1 includes the demodulation circuit 52 and the oscillation circuit 54. Based on the reference signal Ss, the demodulation circuit 52 demodulates a sample signal derived from the object 14, from a light detection signal detected based on a photocurrent (the light reception signal). The oscillation circuit 54 operates using the vibration element 30 as a signal source, and outputs the reference signal Ss to the demodulation circuit 52 as illustrated in FIG. 1.

According to such a configuration, even when the natural frequency $f_Q$ of the vibration element 30 fluctuates, the oscillation frequency $f_{osc}$ of the oscillation circuit 54 can be changed to a value corresponding to the natural frequency $f_Q$ of the vibration element 30, and thus the vibration of the vibration element 30 can be easily stabilized. Accordingly, a temperature characteristic of a modulation signal can be made to correspond to a temperature characteristic of the vibration element 30, and the modulation characteristic of the optical modulator 12 can be stabilized. As a result, the demodulation accuracy of a sample signal in the demodulation circuit 52 can be improved.

In the above-described configuration, a temperature characteristic of the reference signal Ss output from the oscillation circuit 54 to the demodulation circuit 52 can also be made to correspond to the temperature characteristic of the vibration element 30. Then, since both the temperature characteristic of the modulation signal and the temperature characteristic of the reference signal correspond to the temperature characteristic of the vibration element 30, a behavior of fluctuation of the modulation signal caused by a temperature change and a behavior of fluctuation of the reference signal Ss caused by a temperature change coincide with or approximate to each other. Therefore, even when a temperature of the vibration element 30 changes, the demodulation accuracy can be prevented from being affected, and the demodulation accuracy of a sample signal derived from the object 14 can be improved.

Further, since the electric power consumption of the oscillation circuit 54 is low, electric power saving of the laser interferometer 1 can be easily achieved.

2. Demodulation Circuit

The demodulation circuit 52 performs demodulation processing of demodulating a sample signal derived from the object 14, from a light detection signal output from the current-voltage converter 531. The sample signal includes, for example, phase information and frequency information. Displacement of the object 14 can be acquired base on the phase information, and a speed of the object 14 can be acquired based on the frequency information. When different physical quantities can be acquired as described, the laser interferometer 1 can have functions of serving as a displacement meter and a speedometer, so that it is possible to improve functionality of the laser interferometer 1.

A circuit configuration of the demodulation circuit 52 is set according to a method of the modulation processing. In the laser interferometer 1 according to the present embodiment, the optical modulator 12 including the vibration element 30 is used. Since the vibration element 30 is an element that vibrates in a simple harmonic motion, a vibration speed changes every moment in a cycle. Therefore, a modulation frequency also changes with time, and a demodulation circuit in the related art cannot be used as it is.

The demodulation circuit in the related art refers to, for example, a circuit that demodulates a sample signal from a light reception signal that includes a modulation signal modulated using an acousto-optic modulator (AOM). In the acousto-optic modulator, a modulation frequency does not change. Therefore, the demodulation circuit in the related art can demodulate a sample signal from a light reception signal including a modulation signal whose modulation frequency does not change, but cannot demodulate a sample signal including a modulation signal modulated by the optical modulator 12 in which a modulation frequency changes as it is.

Therefore, the demodulation circuit 52 illustrated in FIG. 1 includes a preprocessing unit 53 and a demodulation processing unit 55. A light detection signal output from the current-voltage converter 531 is first subjected to prepro-cessing by the preprocessing unit 53, and then introduced to the demodulation processing unit 55. A signal that can be demodulated by a demodulation circuit in the related art is obtained by the preprocessing. Therefore, the demodulation processing unit 55 demodulates a sample signal derived from the object 14 by using a known demodulation method.

The above-described functions of the demodulation cir-cuit 52 are implemented by, for example, hardware includ-ing a processor, a memory, an external interface, an input unit, a display unit, and the like. Specifically, the processor reads and executes a program stored in the memory, thereby implementing the functions. These components can com-municate with one another via an internal bus.

Examples of the processor include a central processing unit (CPU) and a digital signal processor (DSP). Instead of a method in which these processors execute software, a method in which a field-programmable gate array (FPGA), an application specific integrated circuit (ASIC), or the like implements the above-described functions may be adopted.

Examples of the memory include a hard disk drive (HDD), a solid state drive (SSD), an electrically erasable programmable read-only memory (EEPROM), a read-only memory (ROM), and a random access memory (RAM).

Examples of the external interface include a digital input/output port such as a universal serial bus (USB), and an Ethernet (registered trademark) port.

Examples of the input unit include various input devices such as a keyboard, a mouse, a touch panel, and a touch pad. Examples of the display unit include a liquid quartz crystal display panel and an organic electro luminescence (EL) display panel.

2.1 Configuration of Preprocessing Unit

The preprocessing unit 53 illustrated in FIG. 1 includes a first bandpass filter 534, a second bandpass filter 535, a first delay adjuster 536, a second delay adjuster 537, a multiplier 538, a third bandpass filter 539, a first AGC unit 540, a second AGC unit 541, and an adder 542. The AGC refers to auto gain control.

A light detection signal output from the current-voltage converter 531 is split into two signals, that is, a first signal S1 and a second signal S2 at a branch portion jp1. In FIG. 1, a path of the first signal S1 is referred to as a first signal path ps1, and a path of the second signal S2 is referred to as a second signal path ps2.

An ADC 533 is coupled between the oscillation circuit 54 and the second delay adjuster 537. The ADC 533 is an analog-to-digital converter, and converts an analog signal into a digital signal at a predetermined sampling bit rate. The ADC 533 is provided in the sensor head unit 51.

Each of the first bandpass filter 534, the second bandpass filter 535, and the third bandpass filter 539 is a filter that selectively transmits a signal in a specific frequency band.

Each of the first delay adjuster 536 and the second delay adjuster 537 is a circuit that adjusts a delay of a signal. The multiplier 538 is a circuit that generates an output signal that is proportional to a product of two input signals. The adder 542 is a circuit that generates an output signal that is proportional to a sum of two input signals.

Next, an operation of the preprocessing unit 53 will be described following flows of the first signal S1, the second signal S2, and the reference signal Ss.

A group delay of the first signal S1 is adjusted by the first delay adjuster 536 after the first signal S1 passes through the first bandpass filter 534 disposed on the first signal path ps1. The group delay to be adjusted by the first delay adjuster 536 corresponds to a group delay of the second signal S2 caused by the second bandpass filter 535 to be described later. With such a delay adjustment, delay times accompanying passage through filter circuits, that is, a delay time of the first signal S1 passing through the first bandpass filter 534 and a delay time of the second signal S2 passing through the second bandpass filter 535 and the third bandpass filter 539, can be made uniform. The first signal S1 passing through the first delay adjuster 536 passes through the first AGC unit 540 and is input to the adder 542.

The second signal S2 is input to the multiplier 538 after passing through the second bandpass filter 535 disposed on the second signal path ps2. The multiplier 538 multiplies the second signal S2 by the reference signal Ss output from the second delay adjuster 537. Specifically, the reference signal Ss that is represented by cos $(\omega_m t)$ and that is output from the oscillation circuit 54 is subjected to a digital conversion of the ADC 533 and a phase adjustment of the second delay adjuster 537, and is input to the multiplier 538. The $\omega_m$ denotes an angular frequency of a modulation signal of the optical modulator 12, and the t denotes time. Thereafter, the second signal S2 passes through the third bandpass filter 539, passes through the second AGC unit 541, and then is input to the adder 542.

The adder 542 outputs an output signal that is in propor-tion to a sum of the first signal S1 and the second signal S2.

2.2 Basic Principle of Preprocessing

Next, a basic principle of the preprocessing in the pre-processing unit 53 will be described. In the following description, as an example, a system in which a frequency changes sinusoidally as a modulation signal and displace-ment of the object 14 also changes in an optical axis direction with simple vibration will be considered. Here, $E_m$, $E_d$, and $\varphi$ are expressed as follows.

$$E_m = a_m \{\cos(\omega_0 t + B \sin \omega_m t + \phi_m) + i \sin(\omega_0 t + B \sin \omega_m t + \phi_m)\} \tag{1}$$

$$E_d = a_d \{\cos(\omega_0 t + A \sin \omega_d t + \phi_d) + i \sin(\omega_0 t + A \sin \omega_d t + \phi_d)\} \tag{2}$$

$$\phi = \phi_m - \phi_d \tag{3}$$

A light detection signal $I_{PD}$ output from the current-voltage converter 531 is theoretically expressed by the following formula.

$$I_{PD} = \langle |E_m + E_d|^2 \rangle \tag{4}$$

$$= \langle |E_m^2 + E_d^2 + 2 E_m E_d| \rangle$$

$$= a_m^2 + a_d^2 + 2 a_m a_d \cos(B \sin \omega_m t - A \sin \omega_d t + \phi)$$

In Formula (4), $E_m$, $E_d$, $\varphi_m$, $\varphi_d$, $\varphi$, $\omega_m$, $\omega_d$, $\omega_0$, $a_m$, and $a_d$ are as follows.

$E_m$: an electric field component of a modulation signal derived from an optical modulator $E_d$: an electric field component of a sample signal derived from an object to be measured $\varphi_m$: an initial phase of the modulation signal derived from the optical modulator $\varphi_d$: an initial phase of the sample signal derived from the object to be measured $\varphi$: an optical path phase difference of a laser interferom-eter $\omega_m$: an angular frequency of the modulation signal derived from the optical modulator $\omega_d$: an angular frequency of the sample signal derived from the object to be measured $\omega_0$: an angular frequency of emission light emitted from a light source $a_m$: coefficient $a_d$: coefficient In addition, $< >$ in Formula (4) represents a time average.

A first term and a second term of Formula (4) represent a DC component, and a third term represents an AC component. When the AC component is defined as $I_{PD \cdot AC}$, $I_{PD \cdot AC}$ is expressed by the following formula:

$$I_{PD \cdot AC} = 2a_m a_d \cos(B \sin \omega_m t - A \sin \omega_d t + \phi) \qquad (5)$$

$$= 2a_m a_d \{\cos(B \sin \omega_m t)\cos(A \sin \omega_d t - \phi) +$$

$$\sin(B \sin \omega_m t)\sin(A \sin \omega_d t - \phi)\}$$

$$A = \frac{f_{dmax}}{f_d} \qquad (6)$$

$$B = \frac{f_{mmax}}{f_m} \qquad (7)$$

A: a phase shift of the sample signal $f_{dmax}$: a Doppler frequency shift of the sample signal $f_d$: a frequency of the sample signal B: a phase shift of the modulation signal $f_{mmax}$: a Doppler frequency shift of the modulation signal $f_m$: a frequency of the modulation signal Here, v-order Bessel functions such as the following formulas (8) and (9) are known.

$$\cos\{\zeta \sin(2\pi f_v t)\} = J_0(\zeta) + 2J_2(\zeta)\cos(2 \cdot 2\pi f_v t) + 2J_4(\zeta)\cos$$
$$(4 \cdot 2\pi f_v t) + \ldots \qquad (8)$$

$$\sin\{\zeta \sin(2\pi f_v t)\} = 2J_1(\zeta)\sin(1 \cdot 2\pi f_v t) + 2J_3(\zeta)\sin$$
$$(3 \cdot 2\pi f_v t) + \ldots \qquad (9)$$

When Formula (5) is subjected to series expansion using the Bessel functions, that is, Formulas (8) and (9), Formula (5) can be transformed into the following formula (10).

$$I_{PDAC} = 2a_m a_d [\{J_0(B) + 2J_2(B)\cos(2 \cdot \omega_m t) + \qquad (10)$$

$$2J_4(B)\cos(4 \cdot \omega_m t) + \ldots \}\cos(A \sin \omega_d t - \phi) -$$

$$\{2J_1(B)\sin(1 \cdot \omega_m t) + 2J_3(B)\sin(3 \cdot \omega_m t) + \ldots \}\sin(A \sin \omega_d t - \phi)]$$

In Formula (10), $J_0(B)$, $J_1(B)$, $J_2(B)$, . . . are Bessel coefficients.

In the transformation described above, theoretically, it can be said that a band corresponding to a specific order can be extracted by a bandpass filter.

Therefore, in the preprocessing unit 53 described above, the preprocessing is performed on a light detection signal in the following flow based on this theory.

First, the light detection signal output from the current-voltage converter 531 is split into two signals, that is, the first signal S1 and the second signal S2 at the branch portion jp1. The first signal S1 passes through the first bandpass filter 534. A center angular frequency of the first bandpass filter 534 is set to $\omega_m$. Accordingly, the first signal S1 after passing through the first bandpass filter 534 is expressed by the following formula.

$$I_{pass1} = J_1(B)\{-\cos(\omega_m t + A \sin \omega_d t - \phi) + \cos(\omega_m t - A \sin \omega_d t + \phi)\} \qquad (11)$$

$$= -2J_1(B)\sin(\omega_m t)\sin(A \sin \omega_d t - \phi)$$

Meanwhile, the second signal S2 passes through the second bandpass filter 535. A center angular frequency of the second bandpass filter 535 is set to a value different from the center angular frequency of the first bandpass filter 534. Here, for example, the center angular frequency of the second bandpass filter 535 is set to $2\omega_m$. Accordingly, the second signal S2 after passing through the second bandpass filter 535 is expressed by the following formula.

$$I_{BPF2} = J_2(B)\cos(2 \cdot \omega_m t) \cdot \cos(A \sin \omega_d t - \phi) \qquad (12)$$

$$= \frac{1}{2}J_2(B)\{\cos(2 \cdot \omega_m t + \cos(A \sin \omega_d t - \phi)) +$$

$$\cos(2 \cdot \omega_m t - \cos(A \sin \omega_d t - \phi))\}$$

The second signal S2 after passing through the second bandpass filter 535 is multiplied by the reference signal Ss by the multiplier 538. The second signal S2 after passing through the multiplier 538 is expressed by the following formula.

$$I_{cos(\omega_m t)} = \frac{1}{2}J_2(B)\{\cos(2 \cdot \omega_m t + A \sin \omega_d t - \phi) + \qquad (13)$$

$$\cos(2 \cdot \omega_m t - A \sin \omega_d t + \phi)\} \cdot \cos(\omega_m t) -$$

$$\frac{1}{2}J_2(B)\{\cos(3 \cdot \omega_m t + A \sin \omega_d t - \phi) + \cos(1 \cdot \omega_m t + A \sin \omega_d t - \phi) +$$

$$\cos(3 \cdot \omega_m t - A \sin \omega_d t + \phi) + \cos(1 \cdot \omega_m t - A \sin \omega_d t + \phi)\}$$

The second signal S2 after passing through the multiplier 538 passes through the third bandpass filter 539. A center angular frequency of the third bandpass filter 539 is set to the same value as the center angular frequency of the first bandpass filter 534. Here, for example, the center angular frequency of the third bandpass filter 539 is set to win. Accordingly, the second signal S2 after passing through the third bandpass filter 539 is expressed by the following formula.

$$I_{pass2} = \frac{1}{2}J_2(B)\{\cos(\omega_m t + A \sin \omega_d t - \phi) + \cos(\omega_m t - A \sin \omega_d t + \phi)\} \qquad (14)$$

$$= J_2(B)\cos(\omega_m t)\cos(A \sin \omega_d t - \phi)$$

Thereafter, a phase of the first signal S1 expressed by Formula (11) is adjusted by the first delay adjuster 536, and an amplitude of the first signal S1 is adjusted by the first AGC unit 540.

An amplitude of the second signal S2 expressed by Formula (14) is adjusted by the second AGC unit 541, and the amplitude of the second signal S2 is made equal to the amplitude of the first signal S1.

Then, the first signal S1 and the second signal S2 are added by the adder 542. An addition result is expressed by the following formula (15).

$$I_{53} = \cos(\omega_m t + A \sin \omega_d t - \phi) \qquad (15)$$

As shown in Formula (15), as a result of the addition, an unnecessary term disappears, and a necessary term can be extracted. That is, an addition result $I_{53}$ expressed by Formula (15) is a signal obtained by extracting a frequency modulation component. The addition result $I_{53}$ is input to the demodulation processing unit 55.

As described above, $J_0(B)$, $J_1(B)$, and $J_2(B)$ are Bessel coefficients, and these coefficients change according to a phase shift B of a modulation signal.

Figure 15:
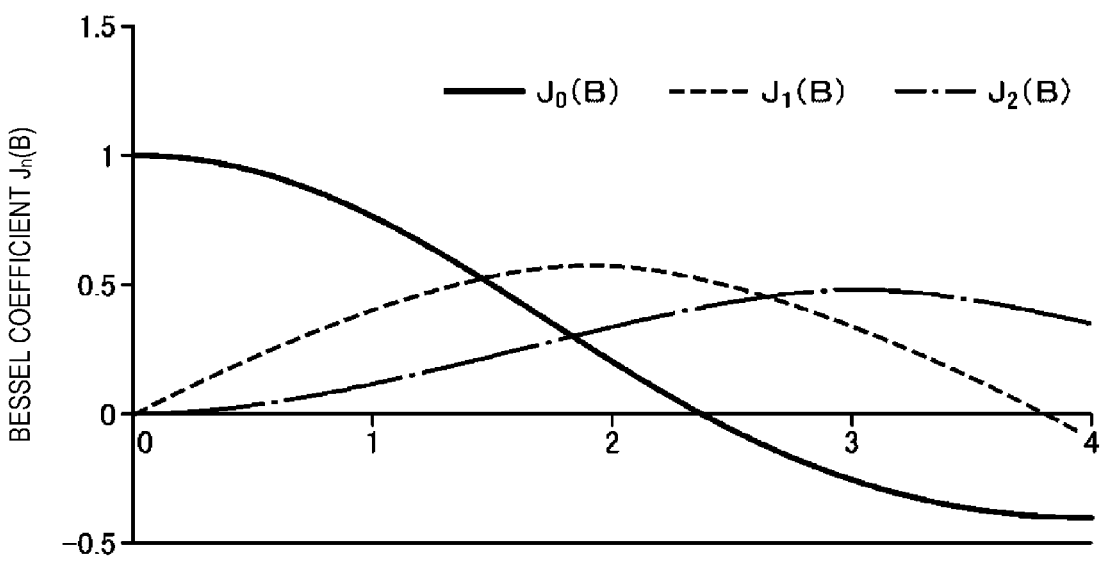
FIG. 15 is a graph illustrating a relationship between Bessel coefficients $J_0(B)$, $J_1(B)$, and $J_2(B)$ and a phase shift B of a modulation signal.

FIG. 15 is a graph illustrating a relationship between the Bessel coefficients $J_0(B)$, $J_1(B)$, and $J_2(B)$ and the phase shift B of a modulation signal. From this graph, when $J_1(B)=J_2(B)$, an S/N ratio of the first signal S1 expressed by Formula (11) and an S/N ratio of the second signal S2 expressed by Formula (14) can be made equal to each other. Accordingly, an S/N ratio of the addition result $I_{53}$ can be further increased.

In FIG. 15, when $J_1(B)=J_2(B)$, the phase shift B of the modulation signal is about 2.6. The phase shift B of the modulation signal depends on a displacement amplitude of the out-of-plane vibration of the vibration element 30, that is, depends on displacement in the Z-axis direction. From a viewpoint of securing a lowest level of measurement accuracy required in the laser interferometer 1, the phase shift B of the modulation signal preferably satisfies 0.05≤B, more preferably satisfies 0.50≤B, and still more preferably satisfies n/3≤B. In the present embodiment, it is possible to increase the phase shift B of the modulation signal by actively exciting the out-of-plane vibration of the vibration element 30.

For example, when a tuning fork type quartz crystal vibrator having a resonance frequency of 32 kHz is oscillated at a drive voltage of 3V, displacement Lq of a tip end portion of an arm in the Z-axis direction is about 175 nm even under atmospheric pressure, which is actual measurement data. When the phase shift B of the modulation signal in a case of using laser light having a wavelength $\lambda=850$ nm is calculated based on the displacement Lq and by using $B=4\pi Lq/\lambda$, $B=$about 2.6.

In addition, for example, when an SC cut quartz crystal vibrator having a resonance frequency of 10.26 MHz is oscillated at a drive voltage of 3V, the displacement Lq in the Z-axis direction is about 13 nm even under atmospheric pressure, which is actual measurement data. When the phase shift B of the modulation signal in a case of using laser light having a wavelength $\lambda=850$ nm is calculated based on the displacement Lq, $B=$about 0.19.

Therefore, according to the vibration element 30 in which the out-of-plane vibration is excited, it is possible to obtain the addition result $I_{53}$ having a high S/N ratio.

2.3 Configuration of Demodulation Processing Unit

The demodulation processing unit 55 performs demodulation processing of demodulating a sample signal, which is derived from the object 14, from a signal output from the preprocessing unit 53. The demodulation processing is not particularly limited, and a known quadrature detection method may be used. The quadrature detection method is a method for executing the demodulation processing by performing an operation of mixing external signals orthogonal to each other with an input signal.

The demodulation processing unit 55 illustrated in FIG. 1 is a digital circuit including a multiplier 551, a multiplier 552, a phase shifter 553, a first low-pass filter 555, a second low-pass filter 556, a divider 557, an arctangent calculator 558, and an output circuit 559.

Each of the multipliers 551 and 552 is a circuit that generates an output signal that is proportional to a product of two input signals. The phase shifter 553 is a circuit that generates an output signal by inverting a phase of an input signal without changing an amplitude of the input signal. Each of the first low-pass filter 555 and the second low-pass filter 556 is a filter that cuts off a signal in a high frequency band.

The divider 557 is a circuit that generates an output signal that is proportional to a quotient of two input signals. The arctangent calculator 558 is a circuit that outputs an arctangent of an input signal. The output circuit 559 calculates a phase $\varphi_d$ as information derived from the object 14, based on a phase $\varphi$ acquired by the arctangent calculator 558. By phase unwrapping processing, the output circuit 559 performs phase coupling when there is a phase jump of $2\pi$ between two adjacent points. Then, displacement of the object 14 is calculated based on obtained phase information. Accordingly, the function of serving as a displacement meter is implemented. In addition, a speed of the object 14 can be obtained based on the displacement. Accordingly, the function of serving as a speedometer is implemented.

The circuit configuration of the demodulation processing unit 55 described above is an example, and the present disclosure is not limited thereto. For example, the demodulation processing unit 55 is not limited to a digital circuit, and may be an analog circuit. The analog circuit may include an F/V converter circuit or a $\Delta\Sigma$ counter circuit.

2.4 Demodulation Processing Performed by Demodulation Processing Unit

In the demodulation processing, first, a signal output from the preprocessing unit 53 is split into two signals at a branch portion jp2. The multiplier 551 multiplies one of the split signals by the reference signal Ss that is output from the oscillation circuit 54 and that is represented by $\cos(\omega_m t)$. The multiplier 552 multiplies the other split signal by a signal that is represented by $-\sin(\omega_m t)$ and that is obtained by the phase shifter 553 shifting a phase of the reference signal Ss output from the oscillation circuit 54 by $-90°$. The reference signal Ss and the signal obtained by shifting the phase of the reference signal Ss are signals whose phases are shifted from each other by $90°$.

The signal passing through the multiplier 551 passes through the first low-pass filter 555, and is then input to the divider 557 as a signal x. The signal passing through the multiplier 552 passes through the second low-pass filter 556, and is then input to the divider 557 as a signal y. The divider 557 divides the signal y by the signal x, and an output y/x passes through the arctangent calculator 558 to obtain an output a $\tan(y/x)$.

Thereafter, the output a $\tan(y/x)$ passes through the output circuit 559, so that the phase $\varphi_d$ is obtained as information derived from the object 14. By the phase unwrapping processing, the output circuit 559 performs the phase coupling when there is a phase jump of $2\pi$ between adjacent points. Then, displacement of the object 14 can be calculated based on the phase information. Accordingly, the function of serving as a displacement meter is implemented. Further, a speed can be calculated based on the displacement. Accordingly, the function of serving as a speedometer is implemented.

On the other hand, the output circuit 559 may be configured to obtain frequency information. The speed of the object 14 can be calculated based on the frequency information.

3. Effects of Embodiment

As described above, the laser interferometer 1 according to the embodiment includes the laser light source 2, the optical modulator 12, the photodetector 10, the demodulation circuit 52, and the oscillation circuit 54.

The laser light source 2 emits the emission light L1 (the first laser light). The optical modulator 12 includes the vibration element 30, and modulates the emission light L1 by using the vibration element 30 to generate the reference light L2 (the second laser light) including a modulation signal. The vibration element 30 generates a vibration component in a direction intersecting an incident surface of the emission light L1. The photodetector 10 receives the reference light L2 and the object light L3 (the third laser light), and outputs a light reception signal. The object light L3 includes a sample signal generated by the emission light L1 being reflected by the object 14. The demodulation circuit 52 demodulates the sample signal from the light reception signal based on the reference signal Ss. The oscillation circuit 54 operates using the vibration element 30 as a signal source, and outputs the reference signal Ss to the demodulation circuit 52.

According to such a configuration, a vibration component (out-of-plane vibration component) in a direction intersecting the incident surface of the emission light L1 in the vibration element 30 can be used for frequency modulation of the emission light L1, and interaction between the vibration of the vibration element 30 and a frequency of the emission light L1 can be increased. Accordingly, it is possible to provide the optical modulator 12 capable of modulating the frequency of the emission light L1, without using a diffraction grating that is necessary for an optical modulator in the related art. As a result, the degree of difficulty in manufacturing the optical modulator 12 can be lowered, and the cost of the laser interferometer 1 can be reduced.

In addition, it is possible to easily increase the phase shift B of a modulation signal by using the out-of-plane vibration component of the vibration element 30. Accordingly, an S/N ratio of the light reception signal can be increased, and finally, the laser interferometer 1 having high measurement accuracy of displacement, speed, and the like can be provided.

Further, since the vibration element 30 serves as a signal source of the oscillation circuit 54, a temperature characteristic of the modulation signal and a temperature characteristic of the reference signal Ss can be made to correspond to a temperature characteristic of the vibration element 30. Since both the modulation signal and the reference signal Ss are processed in real time by the demodulation circuit 52, a behavior of fluctuation of the modulation signal accompanying a temperature change and a behavior of fluctuation of the reference signal Ss accompanying the temperature change coincide with or approximate to each other. Therefore, even when a temperature of the vibration element 30 changes, the demodulation accuracy can be prevented from being affected, and the demodulation accuracy of a sample signal derived from the object 14 can be improved. Accordingly, the laser interferometer 1 having excellent resistance to disturbance can be provided.

In addition, the optical modulator 12 includes containers 70, 70A, and 70B or cases 502A, 502B, and 502C that are housings having an accommodating portion for accommodating the vibration element 30. The accommodating portion is preferably in depressurized state.

According to such a configuration, vibration efficiency of the vibration element 30 accommodated in the accommodating portion can be increased, and the displacement of the vibration can be further increased. In addition, oscillation of the vibration element 30 can be stabilized. As a result, an S/N ratio of the modulation signal can be further increased.

The containers 70, 70A, and 70B and the cases 502A, 502B, and 502C (housings) have the lid 74 or the transmission windows 71A, 71B, 504A, and 504B as transmission windows that separate the accommodating portion from the outside and that transmit the emission light L1 (the first laser light) and the reference light L2 (the second laser light). Depending on the configuration of the optical system 50, the object light L3 (the third laser light) may be transmitted, as will be described later. For this reason, it is sufficient that the transmission window is capable of transmitting the emission light L1, the reference light L2, and the object light L3.

According to such a configuration, even when the accommodating portion is hermetically sealed, the emission light L1 can be incident on the vibration element 30 through the transmission window, and the reference light L2 can be emitted to the outside. In addition, the containers 70, 70A, and 70B may be manufactured together with the vibration element 30 by a manufacturing process at a wafer level. Therefore, a manufacturing cost of the optical modulator 12 including the containers 70, 70A, and 70B can be easily reduced.

In addition, surfaces of the transmission windows 71A and 504B both have a curved shape. Examples of the curved shape include an aspherical shape.

According to such a configuration, the transmission windows 71A and 504B can be provided with not only a function of transmitting the emission light L1 and the reference light L2 but also a function of adjusting traveling directions of the emission light L1 and the reference light L2. Accordingly, a range in which light is incident can be narrowed, a size of the optical system 50 can be reduced, and the number of components of the optical system 50 can be reduced by providing the transmission windows 71A and 504B to function as the collimator lens 3.

In addition, the transmission window 71B is provided in a posture inclined with respect to an incident direction of the emission light L1 (incident light).

According to such a configuration, even if the emission light L1 is reflected by the main surface 711 (the surface on which the emission light L1 is incident) of the transmission window 71B and the reflected light L4 is generated, it is possible to reduce the probability that the reflected light L4 is incident on the photodetector 10. When the reflected light L4 is incident on the photodetector 10, the reflected light L4 causes a decrease in an S/N ratio of the light reception signal. Therefore, it is possible to prevent a decrease in an S/N ratio of the light reception signal by using the transmission window 71B provided in an inclined posture.

The vibration element 30 is a quartz crystal vibrator, a silicon vibrator, or a ceramic vibrator. These vibrators are vibrators using a resonance phenomenon, and thus have a high Q value and can easily have a stabilized natural frequency. Accordingly, an S/N ratio of the modulation signal can be increased, and accuracy of the reference signal Ss can be improved. Accordingly, a sample signal derived from the object 14 can be demodulated at a high S/N ratio, and the laser interferometer 1 capable of measuring a speed and displacement of the object 14 with higher accuracy can be provided.

In particular, the quartz crystal vibrator is preferably a tuning fork type quartz crystal vibrator or an SC cut quartz crystal vibrator.

In these vibrators, out-of-plane vibration, which is a subsidiary vibration, is easily coupled to in-plane vibration, which is main vibration, and thus large displacement of the out-of-plane vibration is easily secured. Accordingly, the phase shift B of the modulation signal can be easily increased, and the S/N ratio of the light reception signal can be further increased.

In addition, the vibration element 30 may be a vibrator for which an out-of-plane vibration mode is set as a main vibration mode, or may be a vibrator having a main vibration mode and a subsidiary vibration mode in which displacement (displacement in out-of-plane vibration) in a direction intersecting the incident surface of the emission light L1 is larger than that in the main vibration mode.

The latter vibrator can be easily manufactured by adjusting a design of an existing vibrator for which in-plane vibration is set as a main vibration mode. Therefore, the latter vibrator can be manufactured at a low cost, and contributes to cost reduction of the laser interferometer 1. Even if the out-of-plane vibration is excited as a subsidiary vibration mode, a displacement amplitude of the out-of-plane vibration is secured to such an extent that $0.05 \leq B$ is sufficiently satisfied, for example. Therefore, by using such a vibration element 30, it is possible to provide the laser interferometer 1 having excellent measurement accuracy while achieving cost reduction.

4. Modifications of Optical System

Next, first to fourth modifications of the optical system 50 will be described.

Figure 16:
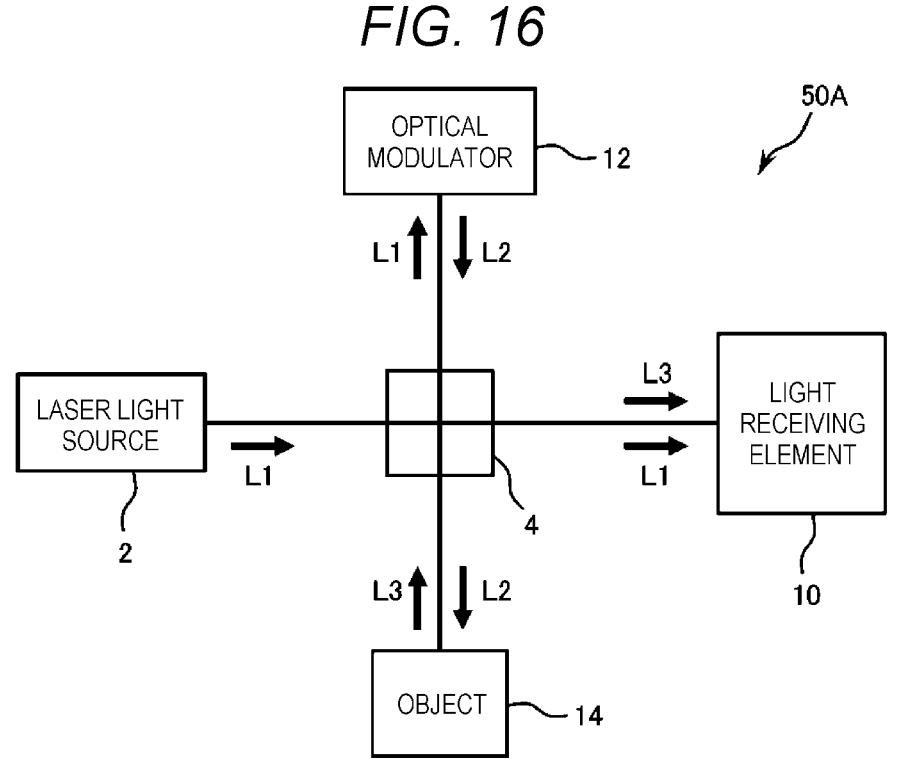
FIG. 16 is a schematic configuration diagram illustrating an optical system according to a first modification.
Figure 17:
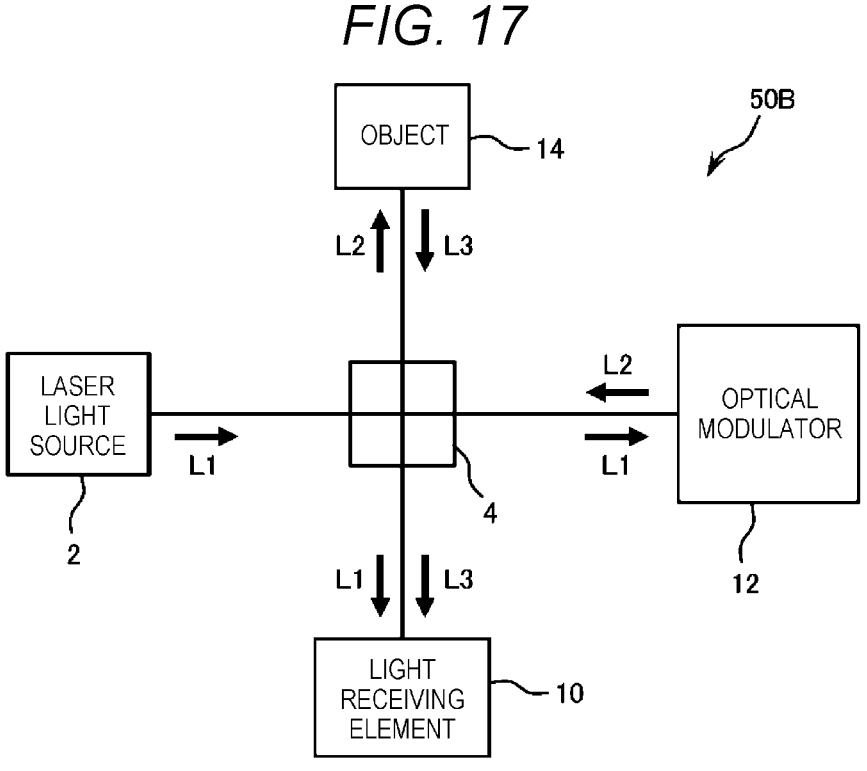
FIG. 17 is a schematic configuration diagram illustrating an optical system according to a second modification.
Figure 18:
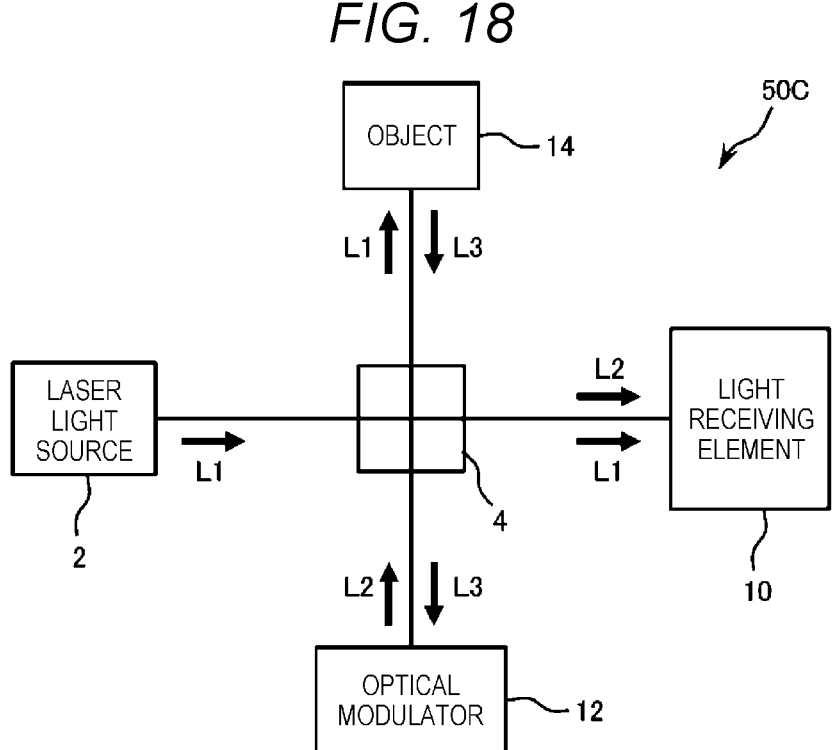
FIG. 18 is a schematic configuration diagram illustrating an optical system according to a third modification.
Figure 19:
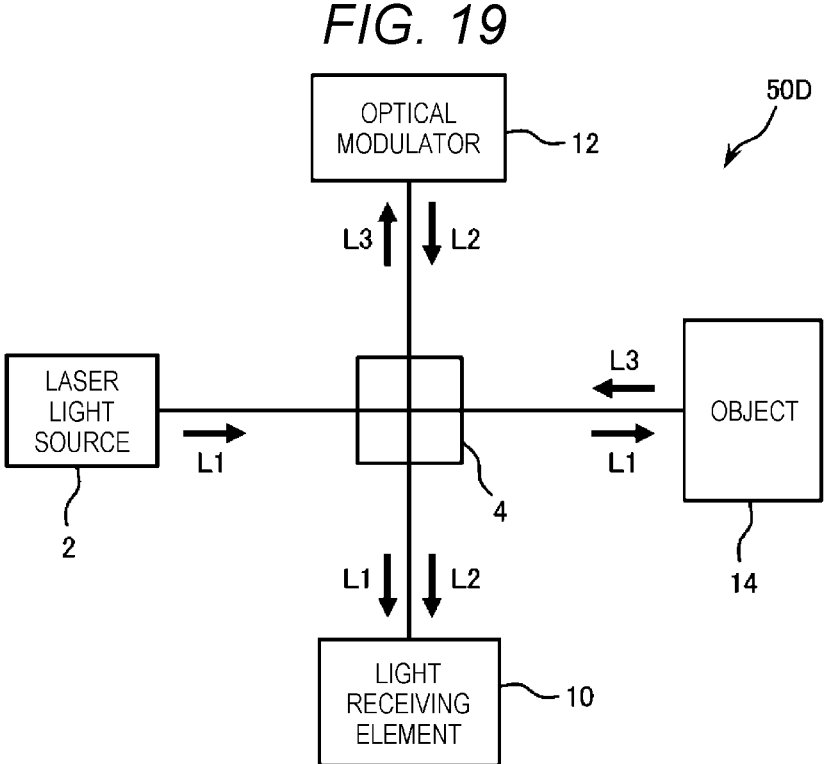
FIG. 19 is a schematic configuration diagram illustrating an optical system according to a fourth modification.

FIG. 16 is a schematic configuration diagram illustrating an optical system 50A according to a first modification. FIG. 17 is a schematic configuration diagram illustrating an optical system 50B according to a second modification. FIG. 18 is a schematic configuration diagram illustrating an optical system 50C according to a third modification. FIG. 19 is a schematic configuration diagram illustrating an optical system 50D according to a fourth modification.

Hereinafter, the first to fourth modifications of the optical system 50 will be described. In the following description, differences from the optical system 50 described above will be mainly described, and a description of the same matters will be omitted. In FIGS. 16 to 19, the same components as those in FIG. 2 are denoted by the same reference signs. In FIGS. 16 to 19, a part of the optical elements are not illustrated.

The optical system 50A illustrated in FIG. 16 is the same as the optical system 50 illustrated in FIG. 2 except that light incident on the photodetector 10, the optical modulator 12, and the object 14 is different. Specifically, in the optical system 50A illustrated in FIG. 16, the emission light L1 (first laser light) is incident on the photodetector 10 and the optical modulator 12. The optical modulator 12 illustrated in FIG. 16 modulates the emission light L1 to generate the reference light L2 (second laser light) including a modulation signal. Subsequently, the reference light L2 is incident on the object 14. Then, the object light L3 (third laser light), which includes a sample signal generated by the reference light L2 being reflected by the object 14, is incident on the photodetector 10. Therefore, the photodetector 10 illustrated in FIG. 16 receives the object light L3 including the sample signal and the modulation signal, and the emission light L1.

The optical system 50B illustrated in FIG. 17 is the same as the optical system 50A illustrated in FIG. 16 except that arrangement of the photodetector 10, the optical modulator 12, and the object 14 is different.

A laser interferometer including the above-described optical systems 50A and 50B according to the first and second modifications includes the laser light source 2, the optical modulator 12, the photodetector 10, and a demodulation circuit and an oscillation circuit, which are not illustrated in FIGS. 16 and 17. The laser light source 2 emits the emission light L1 (first laser light). The optical modulator 12 includes a vibration element having a vibration component in a direction intersecting an incident surface of the emission light L1, and modulates the emission light L1 by using the vibration element to generate the reference light L2 (second laser light) including a modulation signal. The photodetector 10 receives the object light L3 (third laser light) and the emission light L1, and outputs a light reception signal. The object light L3 includes the modulation signal and a sample signal that is generated by the reference light L2 being reflected by the object 14. The demodulation circuit demodulates the sample signal from the light reception signal based on a reference signal. The oscillation circuit operates using the vibration element as a signal source, and outputs the reference signal to the demodulation circuit.

According to such a configuration, the same effects as those of the above-described embodiment can be obtained. That is, it is possible to provide the optical modulator 12 capable of modulating a frequency without using a diffraction grating. As a result, a degree of difficulty in manufacturing the optical modulator 12 can be lowered, and a cost of the laser interferometer 1 can be reduced. In addition, it is possible to obtain a laser interferometer having high measurement accuracy and excellent resistance to disturbance.

The optical system 50C illustrated in FIG. 18 is the same as the optical system 50A illustrated in FIG. 16, except that arrangement of the optical modulator 12 and the object 14 is different, and that light incident on the photodetector 10, the optical modulator 12, and the object 14 is different. Specifically, in the optical system 50C illustrated in FIG. 18, the emission light L1 (first laser light) is incident on the photodetector 10 and the object 14. The emission light L1 is reflected by the object 14 to generate the object light L3 (third laser light). Subsequently, the object light L3 is incident on the optical modulator 12. The optical modulator 12 illustrated in FIG. 18 modulates the object light L3 to generate the reference light L2 (second laser light) including both a sample signal and a modulation signal. The reference light L2 is incident on the photodetector 10. Therefore, the photodetector 10 illustrated in FIG. 18 receives the reference light L2 including the sample signal and the modulation signal, and the emission light L1.

The optical system 50D illustrated in FIG. 19 is the same as the optical system 50C illustrated in FIG. 18 except that arrangement of the photodetector 10, the optical modulator 12, and the object 14 is different.

A laser interferometer including the above-described optical systems 50C and 50D according to the third and fourth modifications includes the laser light source 2, the optical modulator 12, the photodetector 10, and a demodulation circuit and an oscillation circuit, which are not illustrated in FIGS. 18 and 19. The laser light source 2 emits the emission light L1 (first laser light). The optical modulator 12 includes a vibration element having a vibration component in a direction intersecting an incident surface of the object light L3 (third laser light), and modulates the object light L3 by using the vibration element to generate the reference light L2 (second laser light) including a modulation signal. The object light L3 includes a sample signal generated by the emission light L1 being reflected by the object 14. The photodetector 10 receives the reference light L2 including the sample signal and the modulation signal, and the emission light L1, and outputs a light reception signal. The demodulation circuit demodulates the sample signal from the light reception signal based on a reference signal. The oscillation circuit operates using the vibration element as a signal source, and outputs the reference signal to the demodulation circuit.

According to such a configuration, the same effects as those of the above-described embodiment can be obtained. That is, it is possible to provide the optical modulator 12 capable of modulating a frequency without using a diffraction grating. As a result, a degree of difficulty in manufacturing the optical modulator 12 can be lowered, and a cost of the laser interferometer 1 can be reduced. In addition, it is possible to obtain a laser interferometer having high measurement accuracy and excellent resistance to disturbance.

Although a laser interferometer according to an aspect of the present disclosure has been described above based on the illustrated embodiment and modifications, the laser interferometer according to the aspect of the present disclosure is not limited to the above-described embodiment and the modifications. A configuration of each part can be replaced with a configuration having the same function. Further, any other components may be added to the laser interferometer according to the above-described embodiment and the modifications.

The laser interferometer according to the present disclosure can be applied to, for example, a vibration meter, an inclinometer, and a distance meter (a length measuring device), in addition to the displacement meter or the speedometer described above. Examples of an application of the laser interferometer according to an aspect of the present disclosure include an optical comb interference measurement technique that enables distance measurement, 3D imaging, spectroscopy, and the like, and an optical fiber gyro that implements, an angular speed sensor, an angular acceleration sensor, and the like.

Two or more of the laser light source, the optical modulator, and the photodetector may be mounted on the same substrate. Accordingly, a size and a weight of the optical system can be easily reduced, and assembling of the optical system can be made easier.

Further, although the embodiment and modifications described above includes a so-called Michelson interference optical system, the laser interferometer according to an aspect of the present disclosure can also be applied as one having an interference optical system of another type such as a Mach-Zehnder interference optical system.

What is claimed is:

1. A laser interferometer comprising:
a laser light source configured to emit first laser light;
an optical modulator including a vibrator that generates a vibration component in a direction intersecting an incident surface of the first laser light, and configured to modulate the first laser light by using the vibrator to generate second laser light including a modulation signal;
a photodetector configured to receive the second laser light and third laser light that includes a sample signal generated by the first laser light being reflected by an object, and output a light reception signal;
a demodulation circuit configured to demodulate the sample signal from the light reception signal based on a reference signal; and
an oscillation circuit configured to operate using the vibrator as a signal source and output the reference signal to the demodulation circuit.

2. The laser interferometer according to claim 1, further comprising:
a housing accommodating the vibrator in an internal space, wherein
the internal space is in a depressurized state.

3. The laser interferometer according to claim 2, wherein the housing includes a transmission window configured to separate the internal space from an outside and transmit at least the first laser light.

4. The laser interferometer according to claim 3, wherein a surface of the transmission window has a curved shape.

5. The laser interferometer according to claim 1, wherein the vibrator is a quartz crystal vibrator, a silicon vibrator, or a ceramic vibrator.

6. The laser interferometer according to claim 5, wherein the quartz crystal vibrator is a tuning fork quartz crystal vibrator or a stress-compensated (SC) cut quartz crystal vibrator.

7. The laser interferometer according to claim 1, wherein the vibrator has a main vibration mode and a subsidiary vibration mode in which displacement in a direction intersecting the incident surface is larger than that in the main vibration mode.

8. The laser interferometer according to claim 1, wherein the vibrator has a reflecting surface provided on a side intersecting a direction of the vibration component.

9. A laser interferometer comprising:
a laser light source configured to emit first laser light;
an optical modulator including a vibrator that generates a vibration component in a direction intersecting an incident surface of the first laser light, and configured to modulate the first laser light by using the vibrator to generate second laser light including a modulation signal;
a photodetector configured to receive the first laser light and third laser light that includes the modulation signal and a sample signal generated by the second laser light being reflected by an object, and output a light reception signal;
a demodulation circuit configured to demodulate the sample signal from the light reception signal based on a reference signal; and
an oscillation circuit configured to operate using the vibrator as a signal source and output the reference signal to the demodulation circuit.

10. The laser interferometer according to claim 9, further comprising:
a housing accommodating the vibrator in an internal space, wherein
the internal space is in a depressurized state.

11. The laser interferometer according to claim 10, wherein
the housing includes a transmission window configured to separate the internal space from an outside and transmit at least the second laser light.

12. The laser interferometer according to claim 11, wherein
a surface of the transmission window has a curved shape.

13. The laser interferometer according to claim 9, wherein the vibrator has a main vibration mode and a subsidiary vibration mode in which displacement in a direction intersecting the incident surface is larger than that in the main vibration mode.

14. The laser interferometer according to claim 9, wherein the vibrator has a reflecting surface provided on a side intersecting a direction of the vibration component.

15. A laser interferometer comprising:
a laser light source configured to emit first laser light;
an optical modulator including a vibrator that generates a vibration component in a direction intersecting an incident surface of third laser light that includes a sample signal generated by the first laser light being reflected by an object, and configured to modulate the third laser light by using the vibrator to generate second laser light including a modulation signal;
a photodetector configured to receive the first laser light and the second laser light that includes the sample signal and the modulation signal, and output a light reception signal;

a demodulation circuit configured to demodulate the sample signal from the light reception signal based on a reference signal; and an oscillation circuit configured to operate using the vibrator as a signal source and output the reference signal to the demodulation circuit.

16. The laser interferometer according to claim 15, further comprising:

a housing accommodating the vibrator in an internal space, wherein the internal space is in a depressurized state.

17. The laser interferometer according to claim 16, wherein the housing includes a transmission window configured to separate the internal space from an outside and transmit at least the third laser light.

18. The laser interferometer according to claim 17, wherein a surface of the transmission window has a curved shape.

19. The laser interferometer according to claim 15, wherein the vibrator has a main vibration mode and a subsidiary vibration mode in which displacement in a direction intersecting the incident surface is larger than that in the main vibration mode.

20. The laser interferometer according to claim 15, wherein the vibrator has a reflecting surface provided on a side intersecting a direction of the vibration component.

* * * * *